US012663356B2

(12) United States Patent
Swami et al.

(10) Patent No.: US 12,663,356 B2
(45) Date of Patent: Jun. 23, 2026

(54) MULTIPLEXED ON-CHIP IMPEDANCE CYTOMETRY SYSTEM AND METHOD

(71) Applicant: UNIVERSITY OF VIRGINIA PATENT FOUNDATION, Charlottesville, VA (US)

(72) Inventors: Nathan Swami, Charlottesville, VA (US); John Mcgrath, Charlottesville, VA (US); Walter Varhue, Glen Allen, VA (US); Carlos Honrado, Charlottesville, VA (US); Vahid Farmehini, Charlottesville, VA (US); Yi Liu, Charlottesville, VA (US)

(73) Assignee: UNIVERSITY OF VIRGINIA PATENT FOUNDATION, Charlottesville, VA (US)

( * ) Notice: Subject to any disclaimer, the term of this patent is extended or adjusted under 35 U.S.C. 154(b) by 304 days.

(21) Appl. No.: 18/642,197

(22) Filed: Apr. 22, 2024

(65) Prior Publication Data

US 2024/0426735 A1 Dec. 26, 2024

Related U.S. Application Data

(63) Continuation of application No. 17/280,480, filed as application No. PCT/US2019/053242 on Sep. 26, 2019, now Pat. No. 11,965,810.

(Continued)

(51) Int. Cl.
*G01N 15/10* (2024.01)
*B01L 3/00* (2006.01)

(Continued)

(52) U.S. Cl.
CPC .... *G01N 15/1023* (2024.01); *B01L 3/502761* (2013.01); *G01N 15/1031* (2013.01);
(Continued)

(58) Field of Classification Search
CPC ........... G01N 15/1023; G01N 15/1031; G01N 15/0227; G01N 15/14; G01N 33/53;
(Continued)

(56) References Cited

U.S. PATENT DOCUMENTS

| 10,927,407 B2 | 2/2021 | Link |
| 11,732,293 B2 | 8/2023 | Bashir et al. |

(Continued)

OTHER PUBLICATIONS

International Search Report and Written Opinion for International Application No. PCT/US2019/053242 dated Jan. 31, 2020.

(Continued)

*Primary Examiner* — Brandi N Hopkins
(74) *Attorney, Agent, or Firm* — Meunier Carlin & Curfman LLC

(57) ABSTRACT

An exemplary method and system is disclosed that facilitate the integration of multiplexed single-cell impedance cytometry in a high throughput format, which can be deployed upstream from microfluidic sample preparation and/or downstream to microfluidic cell separation. In exemplary method and system may employ impedance-based quantification of cell electrophysiology on the same microfluidic chip (i.e., "on-chip") to provide distinguishing phenotypic information on the sample, without the need for additional sample handling, preparation or dilution steps as would be needed for other flow cytometry techniques.

20 Claims, 19 Drawing Sheets

Related U.S. Application Data

(60) Provisional application No. 62/736,685, filed on Sep. 26, 2018.

(51) Int. Cl.
*B03C 5/00* (2006.01)
*B03C 5/02* (2006.01)
*G01N 15/1031* (2024.01)

(52) U.S. Cl.
CPC . *B01L 2200/027* (2013.01); *B01L 2200/0652* (2013.01); *B01L 2200/10* (2013.01); *B01L 2300/0645* (2013.01); *B01L 2400/0424* (2013.01)

(58) Field of Classification Search
CPC ....... G01N 33/48735; G01N 33/57545; G01N 15/0266; G01N 33/54366; G01N 33/48721; G01N 15/1456; B01L 3/502761; B01L 2200/027; B01L 2200/0652; B01L 2200/10; B01L 2300/0645; B01L 2400/0424; B01L 3/502776; B01L 3/502738; B01L 2200/27; B01L 3/502784; B01L 2200/652; B01L 3/502; B01D 15/3804; C12M 1/34; C12M 23/16; C12Q 1/18; B03C 5/00; B03C 1/015; A61P 35/02; B82Y 5/00
See application file for complete search history.

(56) References Cited

U.S. PATENT DOCUMENTS

| | | | | |
|---|---|---|---|---|
| 11,738,337 | B2 | 8/2023 | Koser | |
| 11,747,327 | B2 | 9/2023 | Samuels et al. | |
| 2003/0110840 | A1 | 6/2003 | Arriaga et al. | |
| 2004/0182707 | A1 | 9/2004 | Jardemark et al. | |
| 2008/0262240 | A1 | 10/2008 | Kibar et al. | |
| 2010/0123457 | A1* | 5/2010 | Shinoda | G01N 15/10 324/228 |
| 2011/0003330 | A1* | 1/2011 | Durack | B01L 3/502761 435/287.1 |
| 2015/0268244 | A1 | 9/2015 | Cho et al. | |
| 2018/0304267 | A1* | 10/2018 | Wang | B01L 3/502784 |
| 2020/0016606 | A1 | 1/2020 | Wu | |

OTHER PUBLICATIONS

James, CD. Impedimetric and optical interrogation of single cells in a microfluidic device for real-time viability and chemical response assessment. Biosensors and Bioelectronics. Sep. 6, 2007. vol. 23. No. 6; pp. 845-851.

Nguyen, NV et al. Impedance detection integrated with dielectrophoresis enrichment platform for lung circulating tumor cells in a miocrofluidic channel. Biosensors and Bioelectronics. Sep. 3, 21018. vol. 121. pp. 10-18.

* cited by examiner

Mercapro-hexanol modification to suppress O₂ reduction on Au

E (V) vs Ag/AgCl
(c) XPS Spectra

E (V) vs Ag/AgCl
(d) Impedance Measurements

Methodology for patient-derived human PDAC collection, propagation and sample preparation

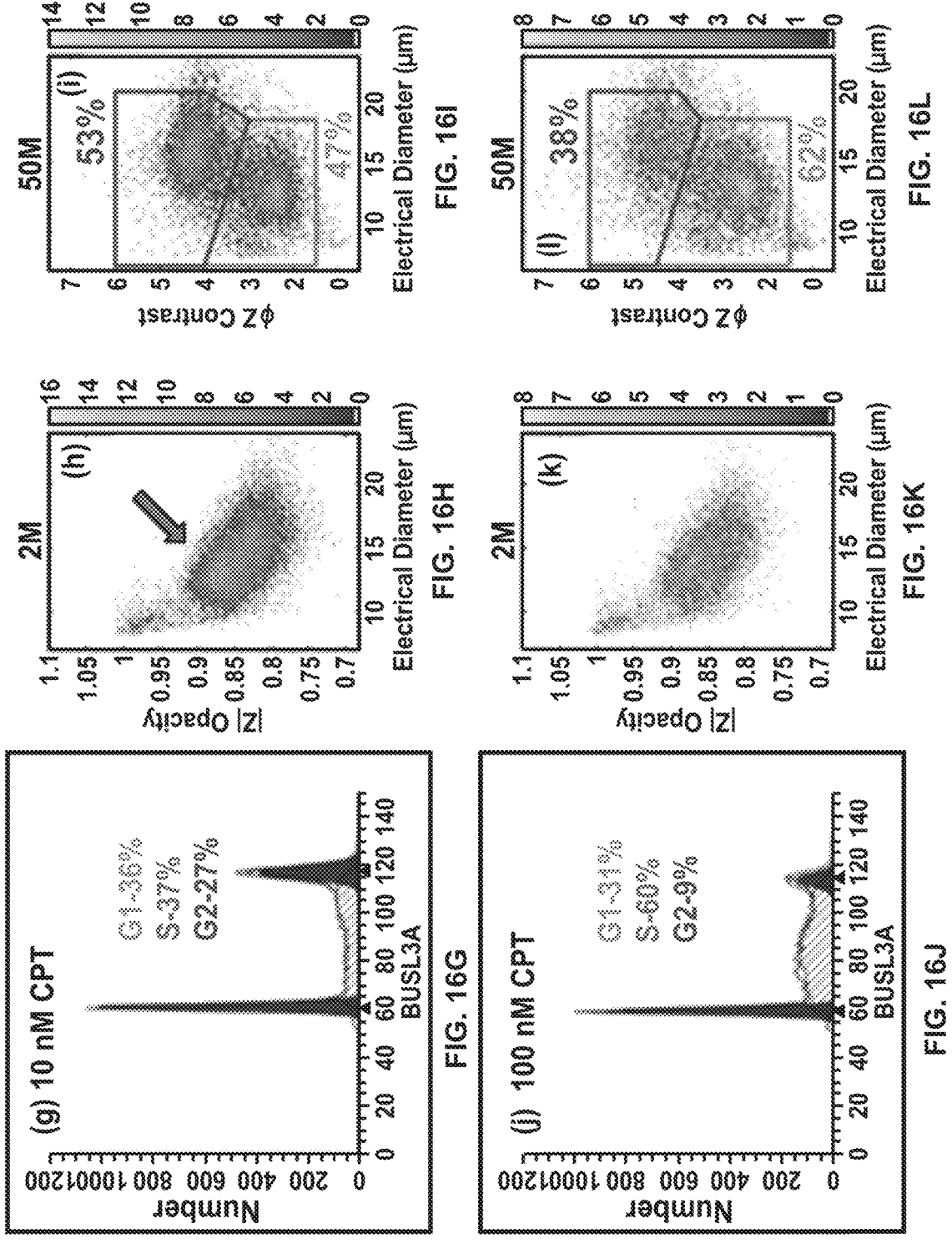

MULTIPLEXED ON-CHIP IMPEDANCE CYTOMETRY SYSTEM AND METHOD

CROSS-REFERENCE TO RELATED APPLICATION

This Application is a continuation of U.S. application Ser. No. 17/280,480, a national stage application filed under 35 U.S.C. § 371 of PCT/US2019/053242 filed Sep. 26, 2019, which claims priority to and benefit under 35 U.S.C. § 119(e) of U.S. Provisional Patent Application Ser. No. 62/736,685, entitled "Quantifying Phenotypic Heterogeneity by Single-Cell and Single-Aggregate Impedance Cytometry for Selective Downstream Isolation Based on Subcellular and Extracellular Phenotypes," filed Sep. 26, 2018, the contents of which are hereby incorporated by reference herein in their entireties as if fully set forth below.

STATEMENT OF GOVERNMENT INTEREST

This invention was made with government support under Grant Nos. AI130902 and CA200755, awarded by the National Institutes of Health. The government has certain rights in the invention.

FIELD

This disclosure relates to the characterization of cells or particles, in particular, the cytometric characterization of cells or particles based on impedance characteristics of the cells or particles.

BACKGROUND

Biological systems exhibit a wide degree of phenotypic heterogeneity, with subpopulations that play vital roles in disease onset, drug resistance, and in determining the differentiation lineage of stem cells. Currently, a vast majority of the single-cell studies to characterize phenotypic heterogeneity of cells are carried out by flow cytometry methods (FCM) and fluorescence-activated cell sorting (FACS). While these flow cytometry techniques facilitate rapid analysis of single cells ($10^3$-$10^4$ cells/s), they often require a large sample size ($\geq 10^5$ cells/mL) that is usually not available with rare stem cells or tumor associated samples from less-invasive fine needle biopsy aspirates. Furthermore, since flow cytometry can usually be applied only as endpoint assays, its application to study therapeutic anticancer targets or regenerative therapies is limited to intermittent time points, without the ability to use the analyzed sample within transplant therapies. Finally, flow cytometry involves multiple sample preparation steps, including staining, centrifugation and high shear flow, which are time-consuming and subject cells to additional stress.

To address these limitations, a generation of microfluidic techniques have emerged that can work with smaller sample sizes, while the pressure-driven flow conditions enable cytometry of ~100 cells/s under physiological conditions that maintain live-cells, with limited flow-induced stress. Examples include cytometry techniques based on fluorescent probes that do not interfere with cell viability, so that intracellular retention can be used for kinetic analysis, or flow imaging techniques capable of quantifying subcellular morphological alterations to cells. However, a vast majority of the emerging microfluidic methods may require prior knowledge on the distinguishing mechanism to enable development of specific stains or image contrast enhancement agents, thus limiting their application in situations where cell processes are unknown or vary from patient-to-patient.

Cell electrophysiology represents an aggregate of bio-physical properties that are influenced by genomic and micro-environmental factors, both of which play critical roles in determining cell phenotype. Hence, electrophysiological analysis can provide phenotypic markers for quantifying the influence of drugs and systems-level biological interactions on individual tumor and stem cells. Furthermore, electrophysiology is sensitive not only to whole-cell characteristics such as size and shape, but also to subcellular features, such as plasma membrane structure, nucleus size and organelle structure in the cytoplasm. In fact, since the conductivity and permittivity of these subcellular components differs considerably from each other, the frequency spectra of impedance of single-cells can yield spatially-resolved information about alterations within each subcellular component, in response to drug targets at various timepoints of interest. However, in order to obtain statistically relevant information on alterations in cellular heterogeneity, these single-cell electrophysiology measurements must be obtained at throughput levels of >100 cells/s to enable phenotypic distinctions using complex clinical samples that contain several other cell types.

SUMMARY

An exemplary method and system is disclosed that facilitate the integration of multiplexed single-cell impedance cytometry in a high throughput format, which can be deployed upstream from microfluidic sample preparation and/or downstream to microfluidic cell separation. In exemplary method and system may employ impedance-based quantification of cell electrophysiology on the same micro-fluidic chip (i.e., "on-chip") to provide distinguishing phenotypic information on the sample, without the need for additional sample handling, preparation or dilution steps as would be needed for other flow cytometry techniques.

In one aspect, a method is disclosed of operating a microfluidic chip (e.g., configured for multiplexed single-cell impedance cytometry), the method comprising flowing a sample comprising biologic or particle components (e.g., cell phenotypes of sorted, unlabeled cells or particles in-line) in a plurality of microfluidic channels of the microfluidic chip, including an upstream microfluidic channel and a plurality of downstream microfluidic channels (e.g. parallel downstream microfluid channels), wherein the upstream microfluidic channel is connected to the plurality of downstream microfluidic channels; applying a first set of electric field (e.g., non-uniform electric field, e.g., via dielectrophoresis) across a first set of one or more electrodes located in the upstream microfluidic channel to selectively urge the biologic or particle components into one or more lanes of a plurality of lanes in a flow to continuously separate the biologic or particle components to channel inlets of the plurality of downstream microfluidic channels (e.g., wherein the separation is solely based on impedance due to electro-physiology characteristics of the biologic or conductivity of the particle components, or the separation is performed in combination with posts for size- and deformability-based separation); applying a second set of electric field across a second set of one or more electrodes located in at least one downstream microfluidic channel of the plurality of downstream microfluidic channels, including in a first downstream microfluidic channel; and interrogating, via the second set of one or more electrodes, electrical responses of the separated biologic or particle components in the at least one downstream microfluidic channel, including electrical responses of the separated biologic or particle components in the first downstream microfluidic channel, wherein the electrical responses are analyzed via impedance magnitude-based contrast and/or impedance phase-based contrast for quantification and/or analysis of the separated biologic or particle components in at least the first downstream microfluidic channel.

In some embodiments, the method further includes quantifying impedance magnitude and/or impedance phase characteristics of the separated biologic or particle components sorted into the second downstream microfluidic channel using the second set of one or more electrodes located in the first downstream microfluidic channel; and quantifying impedance and/or phase impedance characteristics of separated biologic or particle components sorted into a second downstream microfluidic channel using a third set of one or more electrodes located in the second microfluidic channel.

In some embodiments, the electrical responses of the separated biologic or particle components in the first and second downstream microfluidic channels are measured simultaneously (e.g., to facilitate continuous flow of the samples through the channel), where the acquired electrical responses are converted to a digitally encoded signal via a common amplifier circuit.

In some embodiments, signals associated with the interrogated electrical responses of the separated biologic or particle components in the first and second downstream microfluidic channels are frequency-division multiplexed into a common bus, where the common bus is connected to the common amplifier circuit.

In some embodiments, the first and second sets of the one or more electrodes are connected to a respective signal source, where each of the respective signal source has a distinct frequency to that of the others to facilitate frequency-division multiplexing.

In some embodiments, the second set of the one or more electrodes has a first set of spacings among individual electrodes of the set, and the third set of one or more electrodes has a second set of spacings among individual electrodes of the set, where the first set of spacings is different from the second set of spacings, and where a single source signal when applied to the different spacings of the first set of spacings and the second set of spacings results in the second set of electrodes generating a field having a different temporal profile of impedance in comparison to that of the third set of electrodes.

In some embodiments, the method further includes detecting, via one or more position detection electrodes located in the first downstream microfluidic channel, presence of the separated biologic or particle components in the first microfluid channel, where the detected presence of the separated biologic or particle components in the first microfluid channel is used for selective interrogation, selective sampling, and/or selective multiplexing of the separated biologic or particle components in the first microfluid channel (e.g., to maximize sensitivity of the measurement).

In some embodiments, the interrogated electrical responses are measured in the first downstream microfluidic channel while the separated biologic or particle components is continuously flowing in the first downstream microfluidic channel.

In some embodiments, the interrogated electrical responses are measured in the first downstream microfluidic channel while the separated biologic or particle components are at a gated position in the first downstream microfluidic channel.

In some embodiments, the second set of electric field applied across the second set of one or more electrodes is similarly, or same, across multiple measurements of the multiple biologic or particle components flowing through the first downstream microfluidic channel.

In some embodiments, a same set of different frequencies are applied, across multiple measurements, to each group of multiplexed downstream microfluidic channels.

In some embodiments, the second set of electric field applied across the second set of one or more electrodes is varied across multiple measurements of the multiple biologic or particle components flowing through the first downstream microfluidic channel.

In some embodiments, different frequencies are swept, across multiple measurements, across each respective group of multiplexed downstream microfluidic channels.

In some embodiments, levels of impedance or value associated therewith is determined by analog circuit, which is configured to detect small time shifts in incoming signals in a differential manner via a PLL phase extractor circuit to enable noise rejection for extracting a phase signal of the measured signal associated with current flow; to average the phase signal; and convert the averaged phase signal to a binary stream of the averaged phase signal.

In some embodiments, the first downstream microfluidic channel has at least one region having a cross-sectional area different to the channel, wherein the cross-sectional area is sized to increase or reduce velocity of the flow through the first downstream microfluidic channel (e.g., to improve sensitivity and/or signal-to-noise performance of the measurement).

In some embodiments, the downstream microfluidic channel includes a third microfluidic channel that splits into a plurality of parallel channels, wherein each of the plurality of parallel channels defines a second flow rate different than the flow rate of the channel feeding the plurality of parallel channels (e.g., wherein the second flow rate is optimal or suitable for impedance measurement in the respective microfluidic channels).

In some embodiments, the second set of one or more electrodes located in the first downstream microfluidic channel is composed predominantly of nanostructured or nanoporous gold, graphene, or platinum.

In some embodiments, the nanoporous gold has been modified with a self-assembled monolayer for electrode passivation against species in the electrolyte sample and/or for selectivity towards particular species in the electrolyte sample.

In some embodiments, the applied first electric field continuously separates the biologic or particle components into the first downstream microfluidic channel based on the impedance characteristics of the biologic or particle components.

In some embodiments, the applied first set of electric field continuously separates (e.g., in a multiplexing operation) the biologic or particle components into the second downstream microfluidic channel, wherein the biologic or particle components sorted to the second downstream microfluidic channel has a different permittivity or conductivity characteristics to the biologic or particle components sorted to the second microfluidic channel.

In some embodiments, the first set of electric field includes a first field applied across electrodes in the first upstream microfluidic channel and a second field applied across electrodes in the first upstream microfluidic channel, where the first field has a first predominant frequency component and the second field has a second predominant frequency component, and where the first predominant frequency component is the same as the second predominant frequency component.

In some embodiments, the first set of electric field includes a first field applied across electrodes in the first upstream microfluidic channel and a second field applied across electrodes in the first upstream microfluidic channel, where the first electric field and the second electric field have the same frequency component, and where the second field is 180-degree phase-shifted with respect to the first field.

In some embodiments, the first set of electric field includes a first field applied across electrodes in the first upstream microfluidic channel and a second field applied across electrodes in the first upstream microfluidic channel, and wherein the first field and the second field have a same frequency component, the second electric field being n-degree phase-shifted with respect to the first field.

In some embodiments, the separated biologic or particle components comprises cells, and wherein the separation is at a rate greater than 100 cells per second.

In some embodiments, the method includes continuously directing the biologic or particle components via an inertial focusing structure (e.g., curved-wall surface defining the microfluidic channel) or a deterministic lateral displacement structure located within, or defining, the first microfluidic channel.

In some embodiments, the impedance magnitude contrast characteristics and/or impedance phase contrast characteristics are used to stratify lineage of cells (e.g., stem cells) or to stratify cells with phenotypic heterogeneity based on disease onset and/or drug resistance.

In some embodiments, the biologic or particle components comprise sorted cells free of labels (e.g., Pancreatic ductal adenocarcinoma, other tumor cells, cells having been therapeutically-treated).

In another aspect, a method is disclosed comprising quantifying impedance characteristics of biologic or particle components in a microfluidic channel of a microfluidic chip, wherein the quantification is performed using a set of electrodes located in the microfluidic channel by sweeping a frequency varying electric field to the set of electrodes over a frequency range starting at a first frequency to a second frequency (e.g., from 1 KHz to 10 MHz, e.g., having a voltage of about 20 Vpp); measuring resulting varying electrical signal from the application of the frequency varying electric field to the biologic or particle components; and determining phase and amplitude signal (e.g., analog data), or value associated therewith (e.g., digital data), of a measured signal associated with current flow; and wherein the determined phase and amplitude signal is used to stratify lineage of cells (e.g., stem cells) or to stratify cells with phenotypic heterogeneity based on disease onset and/or drug resistance.

In another aspect, a fluidic chip apparatus is disclosed comprising a plurality of microfluidic channels configured to receive a sample comprising biologic or particle components, wherein the plurality of microfluidic channels includes a first microfluidic channel, a second microfluidic channel, and a third microfluidic channel, and wherein the first microfluidic channel is connected to the second microfluidic channel and the third microfluidic channel; and one or more sets of electrodes located in the first microfluidic channel, wherein the one or more sets of electrodes are configured to continuously separates the biologic or particle components into the second microfluidic channel based on impedance characteristics of the biologic or particle components, wherein the separated biologic or particle components are subsequently quantified and/or analyzed via an impedance-based quantification of cell electrophysiology in accordance with the above method steps.

In another aspect, a fluidic chip apparatus is disclosed comprising a plurality of microfluidic channels configured to receive a sample comprising biologic or particle components, wherein the plurality of microfluidic channels includes a first microfluidic channel, a second microfluidic channel, and a third microfluidic channel, and wherein the first microfluidic channel is connected to the second microfluidic channel and the third microfluidic channel; and one or more sets of electrodes located in the second microfluidic channel, wherein the one or more sets of electrodes are configured to apply frequency varying electric field to the biologic or particle components, and wherein the resulting varying electrical signal comprises a quantified impedance characteristics associated with electrophysiology of the biologic or particle components, wherein determined phase and amplitude data set of the quantified impedance characteristics is used to stratify lineage of cells (e.g., stem cells) or to stratify cells with phenotypic heterogeneity based on disease onset and/or drug resistance in accordance with the above method steps.

In another aspect, a cytometry system is disclosed comprising the fluidic chip of any of the above apparatus.

In another aspect, an impedance phase cytometry method, comprising: quantifying, via impedance phase contrast performed by on-chip analysis, positions of multi-cell samples aggregated into a microfluidic channel; and selectively triggering downstream separation downstream to the positions based on the quantification.

Other aspects and features according to the example embodiments of the disclosed technology will become apparent to those of ordinary skill in the art, upon reviewing the following detailed description in conjunction with the accompanying figures.

DETAILED DESCRIPTION

Figure 1:
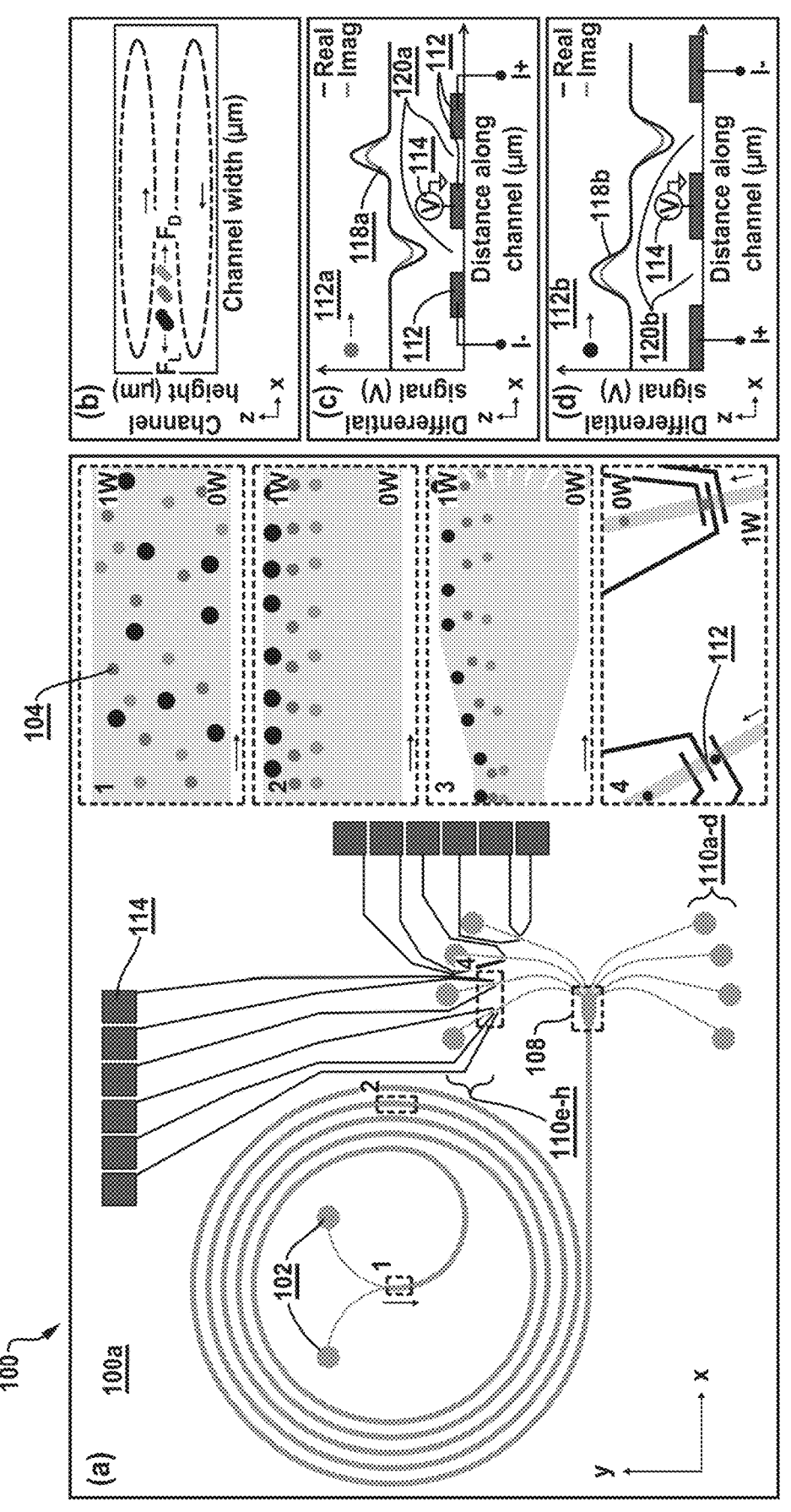
FIG. 1 comprising sub-panes (a)-(d), hereinafter referred to as FIGS. 1A, 1B, 1C, and 1D, show an exemplary impedance cytometry system comprising a microfluidic chip configured with microfluidic impedance separation and quantification in accordance with an illustrative embodiment.

In some aspects, the disclosed technology relates to free-breathing parameter mapping with high-contrast image registration. Although example embodiments of the disclosed technology are explained in detail herein, it is to be understood that other embodiments are contemplated. Accordingly, it is not intended that the disclosed technology be limited in its scope to the details of construction and arrangement of components set forth in the following description or illustrated in the drawings. The disclosed technology is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the disclosed technology. Similarly, it is also to be understood that the mention of one or more components in a device or system does not preclude the presence of additional components or intervening components between those components expressly identified.

As discussed herein, a "subject" (or "patient") may be any applicable human, animal, or other organism, living or dead, or other biological or molecular structure or chemical environment, and may relate to particular components of the subject, for instance specific organs, tissues, or fluids of a subject, may be in a particular location of the subject, referred to herein as an "area of interest" or a "region of interest."

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "[n]" corresponds to the nth reference in the list. For example, [1] refers to the first reference in the list, namely Rahib, L. et al., Cancer Research, 2014. 74(11): p. 2913-2921. All references cited and discussed in this specification are incorporated herein by reference in their entireties and to the same extent as if each reference was individually incorporated by reference.

In the following description, references are made to the accompanying drawings that form a part hereof and that show, by way of illustration, specific embodiments or examples. In referring to the drawings, like numerals represent like elements throughout the several figures.

FIG. 1A shows an exemplary impedance cytometry system 100 comprising a microfluidic chip 100a configured with microfluidic impedance separation and quantification in accordance with an illustrative embodiment. FIGS. 1B, 1C, and 1D show details of the exemplary impedance cytometry system 100 of FIG. 1A in accordance with an illustrative embodiment.

The exemplary system 100, in some embodiments, may be used for rapid on-chip distinction and cytometry of cell phenotypes of sorted, unlabeled cells (or particles), for in-line, real-time and at high-throughput assessment, within each of the branching channels. That is, the impedance-based quantification of cell electrophysiology, or particles, facilitate concurrent sorting and separation that can be scaled to a multi-channel system that can distinguish and/or stratify phenotype cells, or particles, based on such cell electrophysiology. These features can be used concurrently with, or for, size and deformability stratification.

In addition, the impedance-based quantification may be performed on the same chip, or external module, to provide distinguishing phenotypic information on the sample without need for, though can be integrated with, external sample handling, preparation, or dilution. The impedance cytometry system 100, in some embodiments, is configured with integrated multiplexing microfluidic cell separation and quantification that can be scaled to any number of branching/separating channels.

In the example microfluidic system 100, the system 100 includes one or more inlet 102 for the entry of fluid sample comprising biologic or particle components (shown as generally as 104). Biologic or particle components 104 may include cell phenotypes of sorted, unlabeled cells. In some embodiments, biologic or particle components 104 include the cell phenotypes of sorted, unlabeled cells in combination with particles in-line, e.g., inorganic material used for calibration. In some embodiments, biologic or particle components 104 include particles such as droplets, hydrogel, and microbubbles, among others.

In some embodiments, and shown in FIG. 1A, the system 100 includes inertial microfluidics feature comprising an upstream spiral channel 106 that terminates at an impedance based separation region 108 in a terminating portion of the microfluidic channel connected to a plurality of branching downstream microfluidic channels 110 (shown as 110a-d and 110c-h) in which each downstream microfluidic channels is configured with a set of electrodes 112 for inline multiplexed impedance assessment. It is contemplated that the exemplary system can be configured with any number of branching/separating channels, including 2, 3, 4, 5, 6, 7, 8, 9, 10, 11, 12, 13, 14, 15, 16, 17, 18, 19, 20. In some embodiments, more than 20 channels may be implemented. Several architectural features of the exemplary system as described herein may be used to facilitate scaling of the microfluidic chip to such high number of channels.

FIGS. 2A, 2B, 2C, and 2D show example microfluidic separation and impedance quantification operations and elements, e.g., that may be used in the impedance cytometry system of FIG. 1A, in accordance with an illustrative embodiment. FIG. 2B illustrates impedance cytometry downstream of a deterministic lateral displacement (DLD) array device (FIG. 2A) or it may be applied downstream of dielectrophoresis separation by negative dielectrophoresis (or nDEP in FIG. 2C) or positive dielectrophoresis (or pDEP in FIG. 2D).

Other micro-fluidic chip configurations may be used. For example, rather than spiral channel that feed to the branching channels, linear channels may be used, e.g., where inertia separation is not needed. In such configuration, the multiplexing configuration may also be used for massive parallel quantification of cells or particles.

As discussed above, the exemplary system and method facilitate multiplexed single-cell impedance cytometry in a high throughput format (e.g., high continuous flow) which can be deployed upstream from microfluidic sample preparation and/or downstream to microfluidic cell separation. In some embodiments, the quantification based on impedance phase and/or amplitude contrast may be performed in real-time and used as a signal to direct inline separation operation of the cell or particles.

Referring back to FIG. 1A, in some embodiments, the electrodes 112 are routed along, or within, the microfluidic chip 100a to a set of corresponding pads 114. A given set of electrodes 112 may include two or more electrode pad disposed in a portion of the branching channel to direct an electric field into the channel.

In FIG. 1A, the example microfluidic system 100 comprises in the impedance-based separation region 108 one or more electrodes to which a non-uniform electric field, e.g., via dielectrophoresis, is applied to selectively urge flowing biologic or particle components into one or more lanes of a plurality of lanes in the flow to continuously separate the biologic or particle components into to channel inlets of the plurality of downstream microfluidic channels. FIG. 2D illustrates the negative dielectrophoresis (nDEP) as well as positive dielectrophoresis (pDEP) that may be performed solely, or in combination with one another, to separate the biologic or particle components. To this end, the separation is based on electrophysiology impedance characteristics of the biologic or conductivity of the particle components.

In FIG. 2D, two or more non-uniform electric fields are shown applied in the upstream microfluidic channel to selectively urge flowing biologic or particle components. These forces operate to separate unlike biologic or particle components per their impedance characteristics from one another to route them into lanes in the flow that will flow into a set of branching downstream microfluidic channels. In some embodiments, one of the field is applied 180 degree shifted from the other field of a different frequency. That is, a force is generated to urge biologic or particle components having electrical characteristics associated with one field in one direction, while a second force generated from the second field have selectivity or correspondence to another set of biologic or particle components that is urged in an opposing direction (i.e., per a different frequency that is 180-degree phase shifted). In some embodiments, a common source signal may be used for the set of electrodes. That is, a single and common source signal may be generated by the system's instrumentation and applied to the two set of electrodes each having a different layout configuration to one another to generate the two different fields of different frequencies. An example is shown in shown in FIGS. 1C and 1D. Of course, in other embodiments, each of the set of electrodes may have an independent source signal to drive the non-uniform field there at.

The impedance or electrical characteristic separation may be performed alone, or in combination with other flow altering features. For example, posts and other lateral displacement structure may be positioned in the channel or channel wall to adjust flow of, and/or stratify, biologic or particle components in the flow for size- and deformability-based separation. In FIG. 2A, deterministic lateral displacement (DLD) structure are shown disposed in the upstream channel, though it may be used in other locations, including in the downstream channels.

Multiplexing On-Chip Instrumentation

To carry out multiplexed impedance assessment across several outlet channels in the exemplary micro-fluidic device, the system, in some embodiments, employs an electrode and device architecture that facilitates in-line assessment capabilities, particularly, multi-channel in-line assessment, without the need for sophisticated acquisition and measurement instrumentation. Such system may be implemented in microfluidic system for application in a portable instrument. In some embodiments, the portable instrument can be integrated in a surgery facility where there is a benefit to isolate and/or quantify cells (e.g., embryonic stem cells) of a particular phenotype. In other embodiments, the portable instrument may be used to determine functionality of cell islets in a transplant facility. In yet other embodiments, the portable instrument may be used to test the number of viable cells in pollen for crop breeding applications.

Figure 2:
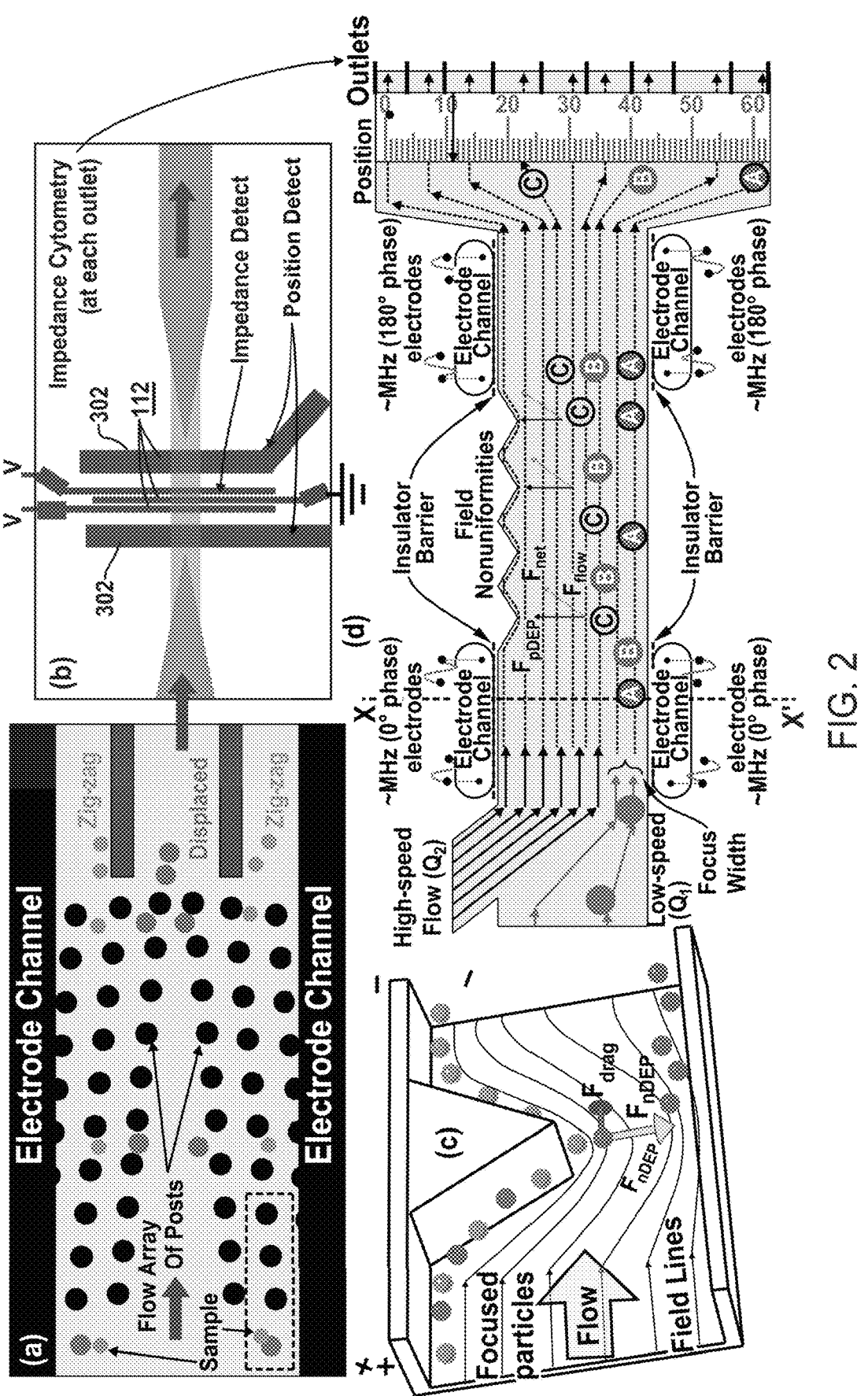
FIG. 2 comprising sub-panes (a)-(d), hereinafter referred to as FIGS. 2A, 2B, 2C, and 2D, show example microfluidic separation and impedance quantification operations and elements, e.g., that may be used in the impedance cytometry system of FIG. 1, in accordance with an illustrative embodiment.
Figure 3:
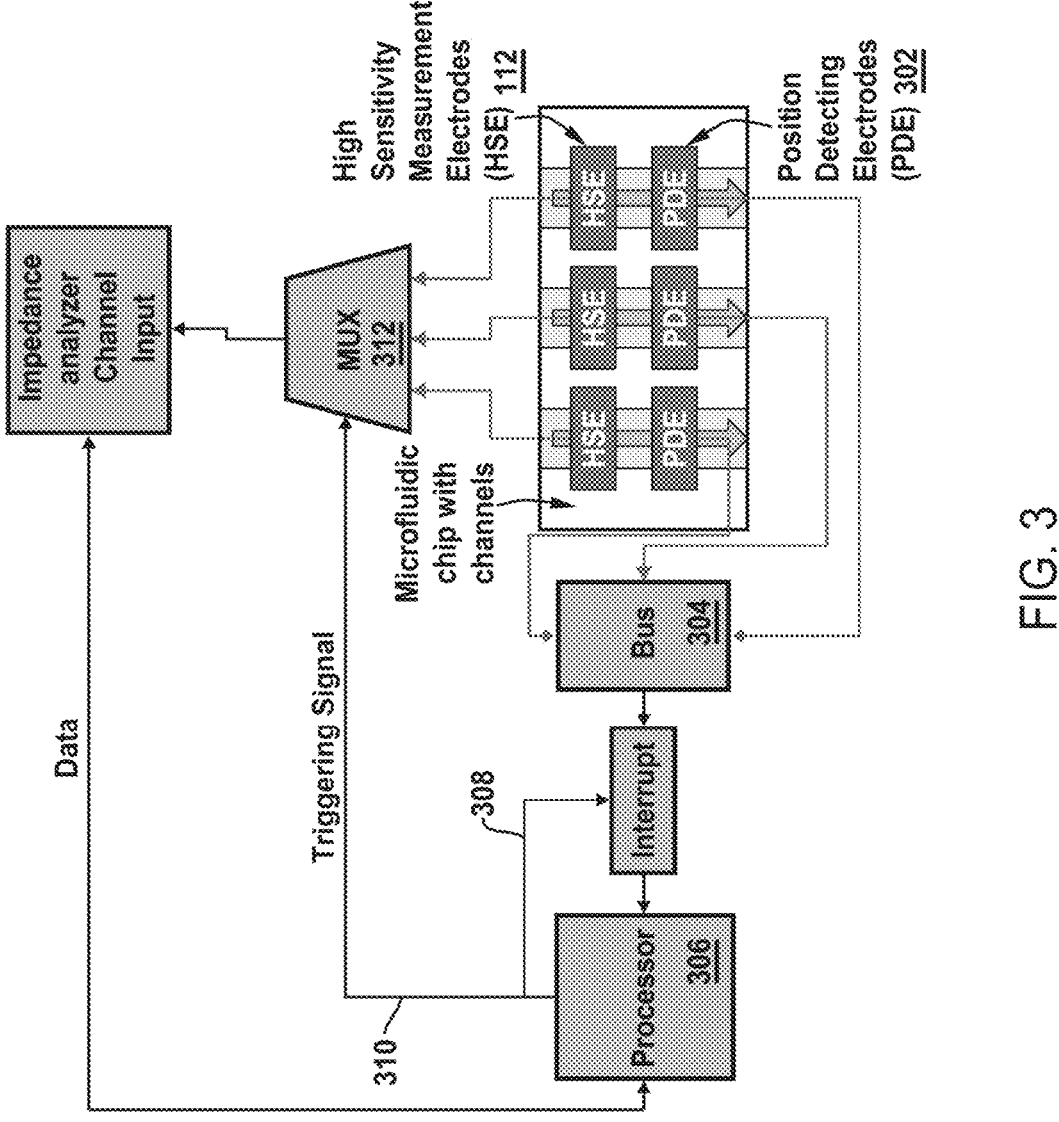
FIG. 3 shows a diagram of an example set of acquisition channels for the exemplary microfluidic chip of FIGS. 1 and 2 in accordance with an illustrative embodiment.

FIG. 3 shows a diagram of an example set of acquisition channels for the exemplary microfluidic chip 100*a* of FIGS. 1 and 2 in accordance with an illustrative embodiment. Indeed, the acquisition channels are configured for multi-plexed impedance detection without the need for multiple transimpedance amplifiers. Of course, such optimization is optional, and the exemplary microfluidic chip can be con-figured with independent acquisition channels, e.g., having separate and independent inputs and outputs.

Electrode Configuration for Frequency-Division Multiplexing

To facilitate the multiplexed configuration, an exemplary microfluidic chip may be configured with electrodes, e.g., in the downstream measurement channels, with different elec-trode spacing. That is, by altering the spacing between the electrodes in each of the separation channels, an exemplary microfluidic chip system can generate different fields of different frequencies. With different frequency operation, the measured signals of the plurality of measurement channels can be simultaneously acquired together and multiplexed, e.g., via frequency-division multiplexing, to recognize the particular channel responsible for the measured impedance. To this end, multiple electrode sets from different measure-ment channels (e.g., having both a real and imaginary component and singularly shown as 118*a* and 118*b*) may be grouped and combined onto one or more common acquisi-tion bus(es). The frequency-division multiplex signals in the common bus(es) may then be independently analyzed in later instrumentation based on the temporal profile of the differential signal characteristics generated from such elec-trodes.

In addition, to further reduced instrumentation complex-ity, the set of electrodes in the measurement channels may be driven by a single voltage signal 114. That is, the acquired signals may be connected into a single common electrical routing. In FIGS. 1C and 1D, two electrode spacing con-figurations are shown for a first set of electrodes 112*a* and a second set of electrodes 112*b*. For the first set of electrode 112*a*, the gap or spacing (shown as 120*a*) between elec-trodes in a first downstream channel along the x-direction corresponding to the direction of flow differs from that (a second set of gap shown as 120*b*) of a second set of electrodes 112*b* in a second downstream channel. Indeed, with such configuration, a single voltage signal 114 may be applied to a source electrode (shown as 114) of each of the measurement electrode set. Of course, in other embodi-ments, the different sets of electrodes are independently controlled via different source signals.

Indeed, by multiplexing the acquisition signals into one, or fewer number of, data signal(s), a single or fewer number of corresponding transimpedance amplifier(s) (and micro-scopes for cell detection) may be used in the analysis of the signals. Further, by multiplexing the acquisition signals into one or fewer number of data signals, fewer electrical routing can be employed between each electrode set and common/ global bond pad(s), thereby reducing instrument complexity and device footprint. That is, in some embodiments all output electrical routing from a set of electrodes in the downstream measurement channel can be routed together, e.g., to a single bond pad.

Position Detection Electrodes

Because cells or other particles of interest can reach the impedance sensing region of a given downstream channel at any time, an exemplary microfluidic chip system may be configured with particle position detection electrodes (PDEs) 302 in each of the measurement channels.

The position detection electrodes may be located before and after the impedance cytometry region. FIG. 2B shows an example design for a set of position detection electrodes 302. FIG. 3 shows example measurement triggering circuit-ries configured to trigger switching of detection electronics for measuring a particular set of impedance electrodes with cells or particles. The position detection electrodes may be disposed in each channel prior to or following the imped-ance cytometry region corresponding to the electrode loca-tion.

The position detection electrodes may be used to trigger operation of the detection electronics for measuring a par-ticular set of impedance electrodes while cells or particles are in the measurement channel. Such triggering operation may be used to facilitate the use of a single transimpedance amplifier for impedance analysis. Such triggering operation may also be used to improve sensitivity of the impedance contrast measurement as only signals associated with the sample are acquired, as to be discussed further below. Indeed, the trigger measurement via use of the position detection electrodes may be performed without need for microscopic imaging and/or corresponding operator.

High Sensitivity Triggering Operation

To improve sensitivity for impedance measurements, an exemplary microfluidic chip system (e.g., 100) may be configured with high sensitivity triggering operation that limits the measurement window, i.e., time window at which the measurement signals are acquired, to when cells or particles are in the downstream channels. That is, the trigger facilitates measurement only when the cell or particles of interest are in the measurement channel. To this end, mea-surement of noise in an empty channel is minimized thus improving computational efficiency (as less computation may be performed) while also reducing the overall noise being considered in any analysis.

In FIG. 3, two sets of sensor electrodes are shown per channel: the position detection electrodes (PDE) 302 and the impedance sensing electrodes (shown as "High Sensitivity Measurement Electrodes (HSE)" 112). The position detect-ing electrodes (PDE) are configured in parallel and con-nected to a common bus 304 and processor 306 to detect the presence of cells in the microchannel. Upon detection of the cell or particle by the position detecting electrodes (302), the processor 306 is configured to interrupt signals (via signal 308) from the position detecting electrodes and sends a triggering signal (310) to a multiplexer 312 to open a pathway for impedance measurement using the high sensi-tivity electrode in that particular, or set of, channels. In FIG. 3, the multiplexer 312 is shown connected to input of an impedance analyzer.

This scheme thus maintains a high sensitivity for each measurement event by reducing or eliminating acquisition of signals in the downstream channel when cells or particles are not present.

High Sensitivity Electrodes

To enhance the acquired signal of cell or particles over background signal for higher sensitive impedance detection, an exemplary microfluidic chip system may employ nano-structured impedance measurement electrodes as the measurement electrodes (e.g., 112). In some embodiments, the electrodes (e.g., 112) maybe made of nanoporous gold (NPG).

Figure 4:
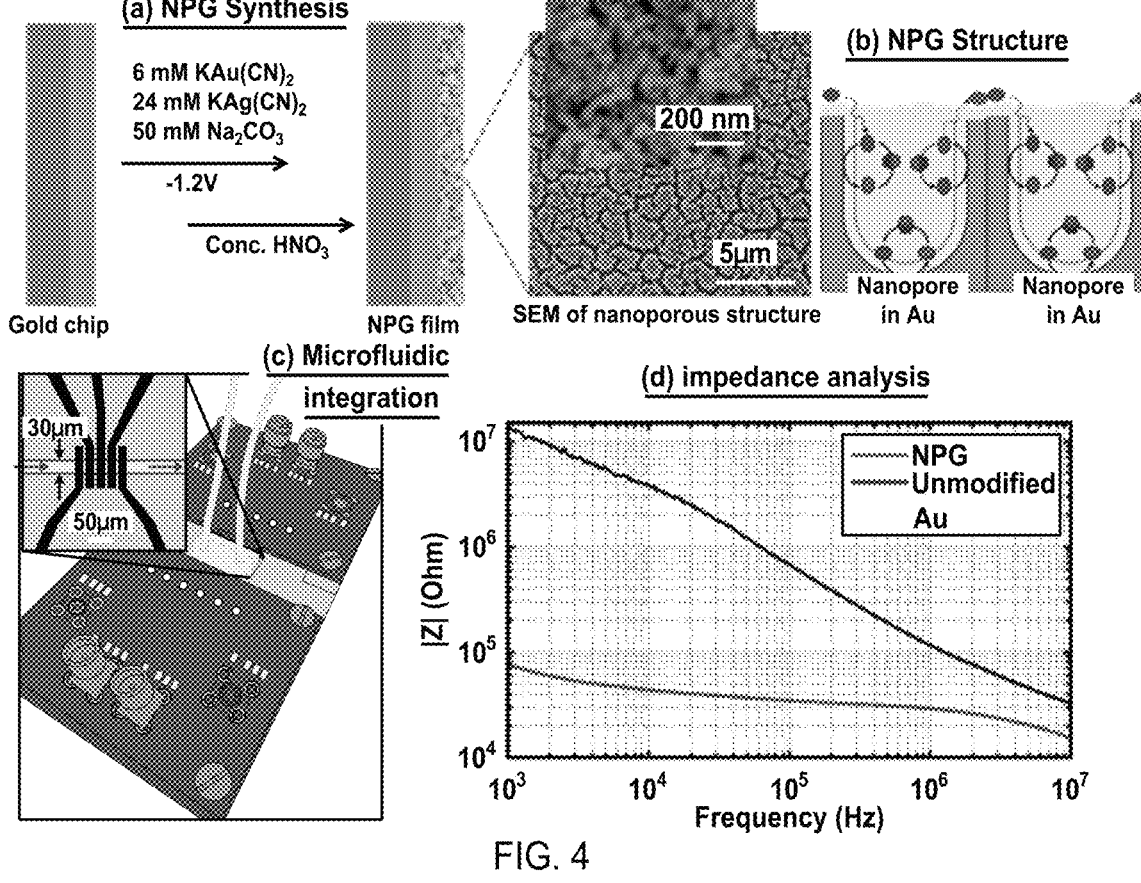
FIG. 4 comprising sub-panes (a)-(d), hereinafter referred to as FIGS. 4A, 4B, 4C, and 4D, show example high sensitivity electrodes and integration of the exemplary microfluidic chip of FIGS. 1 and 2 in accordance with an illustrative embodiment.

FIGS. 4A, 4B, 4C, and 4D show example high sensitivity electrodes and integration of the exemplary microfluidic chip of FIGS. 1 and 2 in accordance with an illustrative embodiment. Specifically, FIG. 4A shows a process of synthesizing nanoporous gold by electrodeposition or sputter deposition of Ag on gold, followed de-alloying to create a porous structure. FIG. 4B shows a SEM image of the porous structure of nanoporous gold. FIG. 4C shows a flow-through microfluidic channel integrated (i.e., coupled) with nanoporous gold electrodes for conducting impedance cytometry.

FIG. 4D shows impedance spectra characteristics of nanoporous gold compared to the spectra of planar gold. As shown in FIG. 4B, the tremendously enhanced electroactive surface area of nanoporous gold electrodes reduces impedance at the surface of the electrode to well beyond 10 MHz in physiological media (phosphate buffered saline or PBS). To this end, nanoporous gold electrode may be used to enhance sensitivity for cytometry of cells or particles, which is particularly useful for detecting responses of such cells or particles away from the electrode surface.

Further detail of nanoporous gold and corresponding processing is provided in Liu, Yi et al., "Electrofabricated biomaterial-based capacitor on nanoporous gold for enhanced redox amplification," Electrochimica Acta (2019), which is incorporated by reference herein in its entirety.

Figure 5:
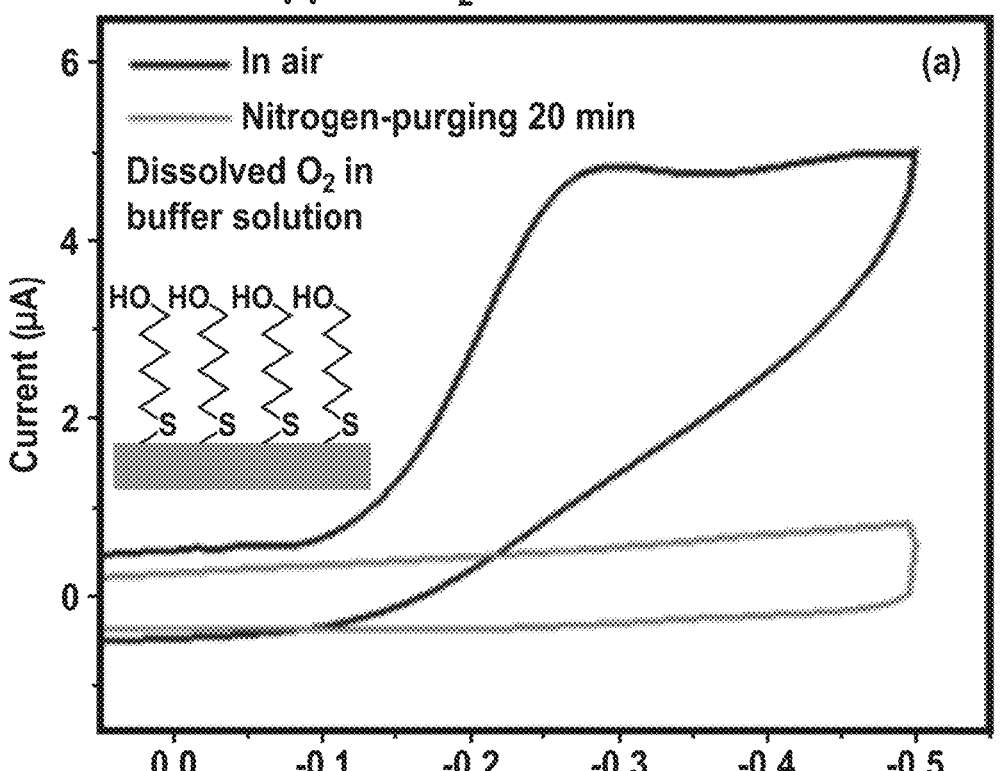
FIG. 5 comprising sub-panes (a)-(d), hereinafter referred to as FIGS. 5A, 5B, 5C, and 5D, show characteristics of nanoporous gold electrodes modified with a self-assembled monolayer for electrode, e.g., for passivation against species in the electrolyte sample or for selectivity towards particular species in the electrolyte sample, in accordance with an illustrative embodiment.
Figure 5:
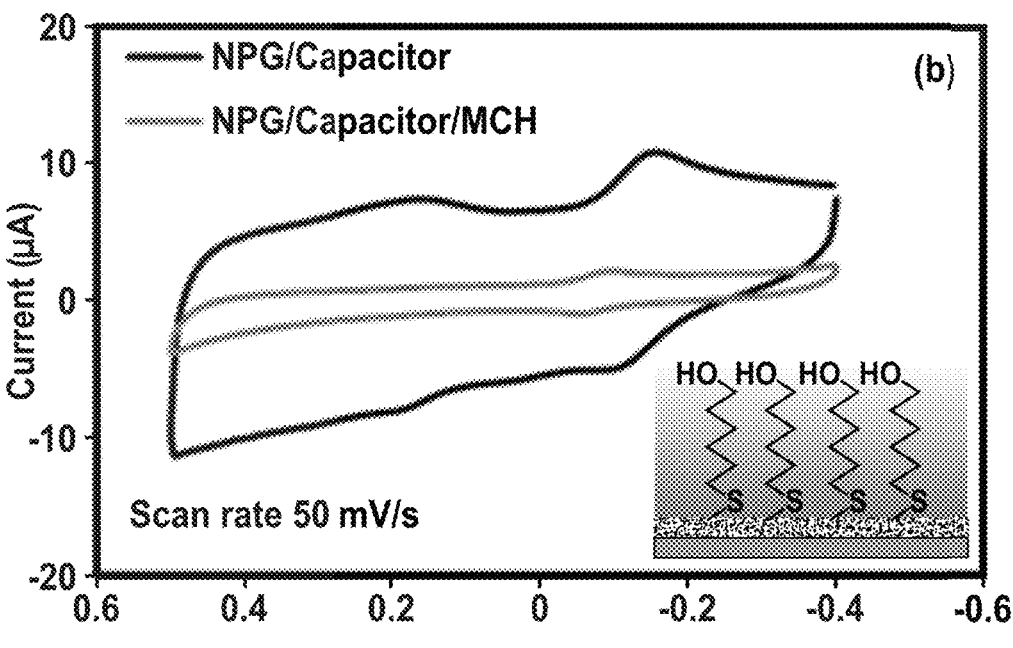
Figure 5:
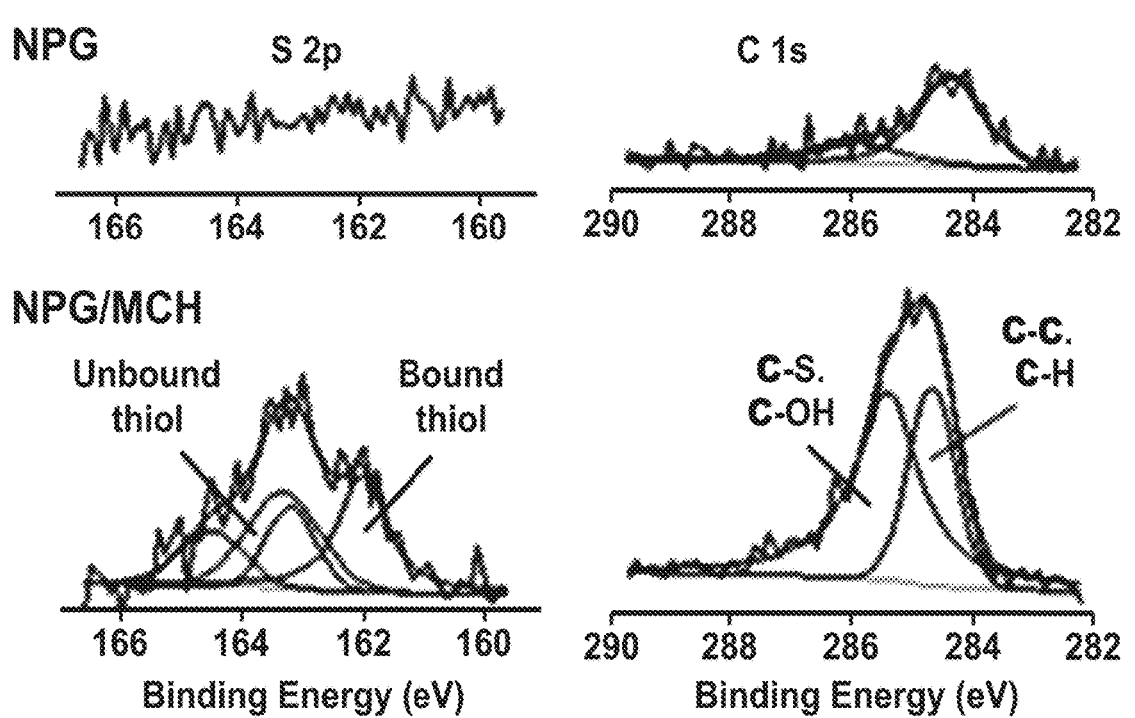
Figure 5:
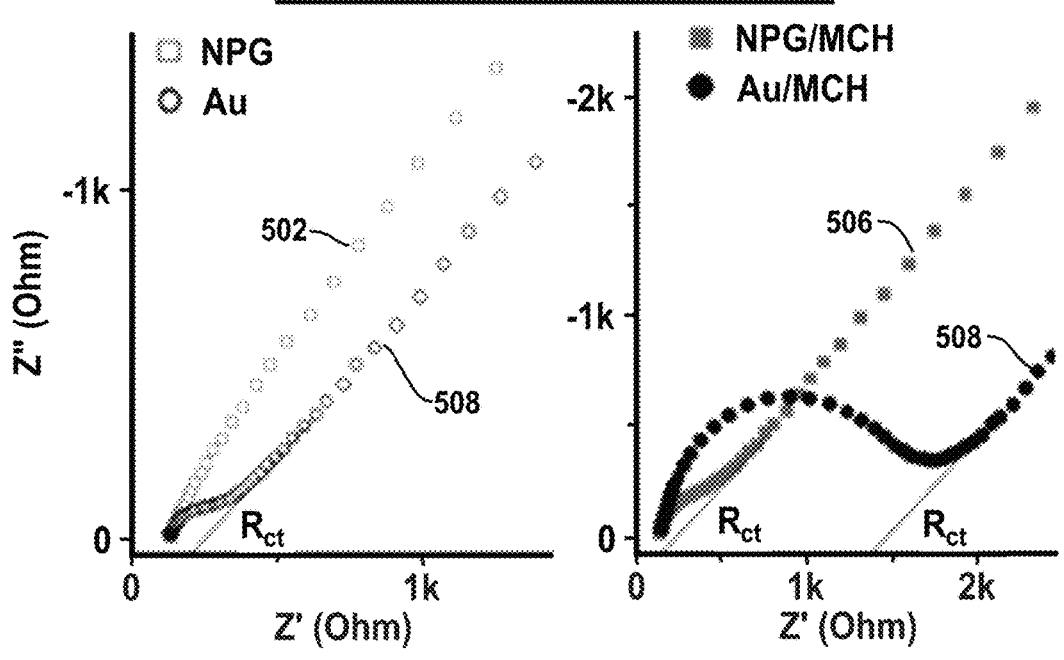

To further enhance sensitivity, the electrode may be modified by a chemical modification to passivate the nanoporous gold material. FIGS. 5A, 5B, 5C, and 5D show characteristics of nanoporous gold electrodes modified with a self-assembled monolayer for electrode, e.g., for passivation against species in the electrolyte sample or for selectivity towards particular species in the electrolyte sample, in accordance with an illustrative embodiment. Specifically, FIGS. 5A and 5B are diagrams illustrating chemically modified characteristics (e.g., mercapro-hexanol modification to suppress oxygen reduction) of passivated nanoporous gold (NPG). FIG. 5A shows chemically modified characteristics of passivated planar gold. FIG. 5B shows chemically modified characteristics of passivated nanoporous gold. To passivate the nanoporous gold and control the net impedance due to electrode surface area, a chemical modification using a self-assembled monolayer of mercaptohexanol (MCH) may be used per the inset in FIG. 5A for planar gold and FIG. 5B for NPG. Indeed, the MCH monolayer is able to passivate the planar and NPG electrodes for oxygen reduction, per the cyclic voltammograms, where the oxygen reduction peak is no longer apparent after MCH modification.

FIG. 5C shows X-ray photoelectron spectroscopy (XPS) spectra characterization of unmodified nanoporous gold and chemically-modified nanoporous gold. FIG. 5c confirms the chemical modification.

FIG. 5D shows impedance characteristics of nanoporous gold (shown as "NPG" 502) and planar gold (shown as "Au" 504) and of passivated nanoporous gold (shown as "NPG/ MCH" 506) and passivated planar gold (shown as "Au/ MCH" 508). Specifically, FIG. 5D shows gauge alteration in charge transfer resistance (Rct) of each of these material. While there is a high degree of enhancement of resistance due to charge transfer (Rct) at the surface of planar gold after MCH modification versus before modification, it can be observed that the analogous change in Rct at the surface of NPG is very small. This result indicates that the surface modification of nanostructured NPG electrodes of large area may produce the desired passivation while allowing the resulting electrodes to continue to have an extremely low background impedance, likely due to its extremely low Rct. Indeed, passivated nanostructured electrodes have much higher sensitivity than planar gold electrodes used conventionally for impedance cytometry of cells and particles.

Slit-Shaped Geometry Design for Measurement Channel

Figure 6A:
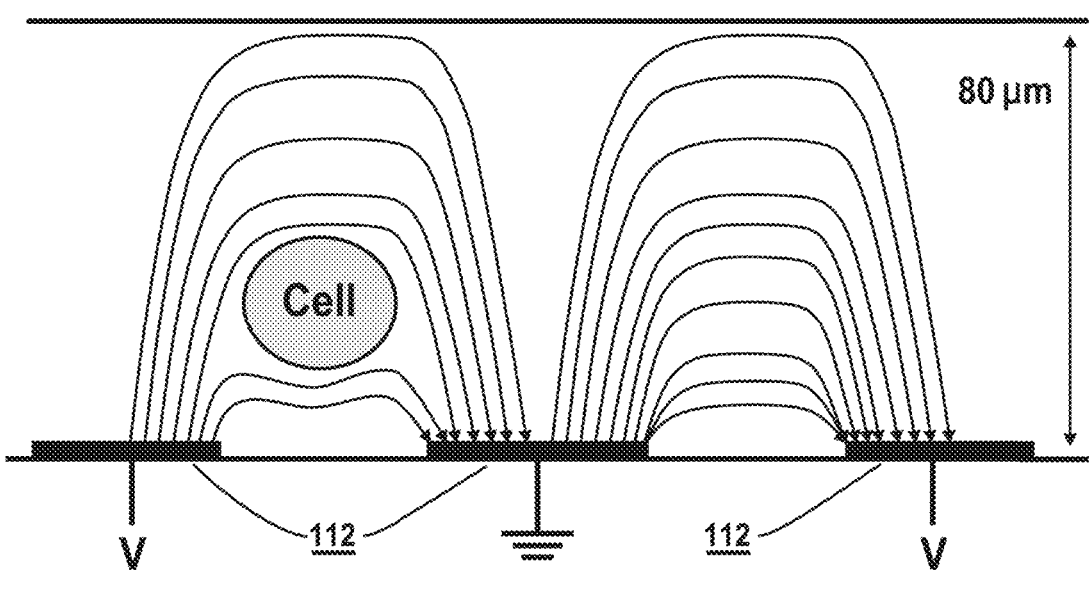
FIGS. 6A and 6B show example geometric configuration for measurement channels to enhance impedance contrast sensitivity in accordance with an illustrative embodiment.
Figure 6B:
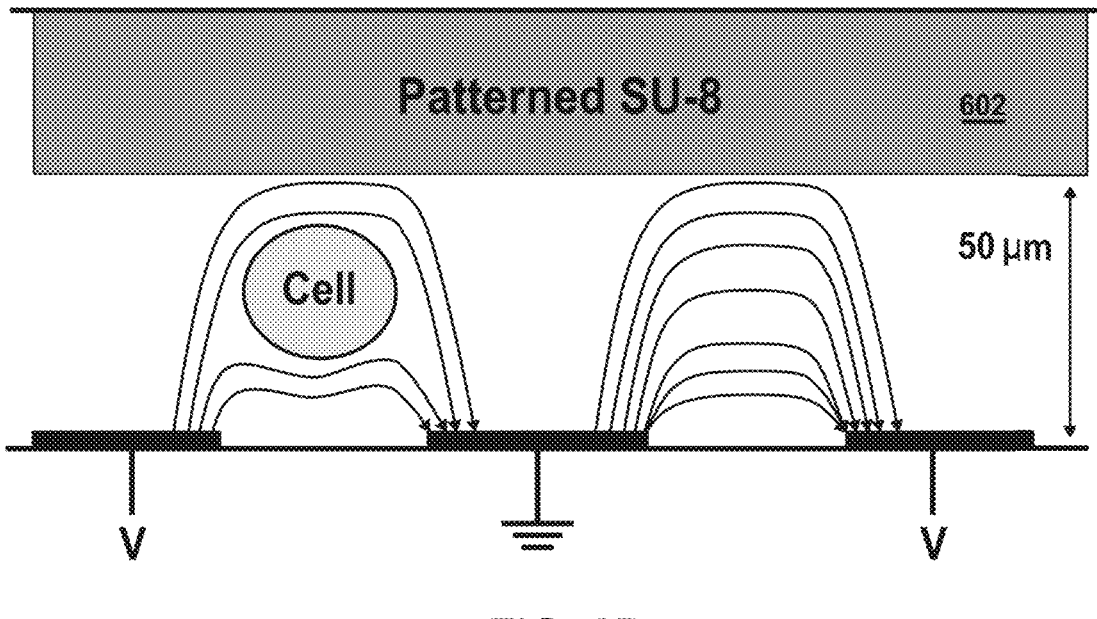

FIG. 6B shows example geometric configuration for measurement channels to enhance impedance contrast sensitivity in accordance with an illustrative embodiment. FIG. 6A shows example geometric configuration for the measurement channels that also may be used.

Specifically, FIG. 6B shows cross-sections of downstream measurement channels configured with patterned micro-slits (602) to confine field lines produced by electrodes (e.g., 112) located in the downstream measurement channel. In some embodiments, the micro-slit are etched into the downstream measurement channel using epoxy-based negative photoresist techniques (SU-8). In some embodiments, the micro-slit comprises one or more angled grooves. In other embodiments, the micro-slit comprises serpentine patterned grooves. The features of the slits are smaller than that of expected cells or particles of interest to allow high throughput flow while restricting such cells or particles from entering.

Many microfluidic separation operation use channels having greater than about 100 μm depth to facilitate high sample throughput conditions. Flow resistance can be high in shallow channels. Because sensitivity of impedance cytometry is restricted or confined to areas proximal of the analyzed region within the channel, e.g., in the range of 5× of the volume of the analyzed particle or cell, the slit-shaped geometric pattern (602) in the downstream measurement channel may be used to restrict cells and particles in the flow to such regions to improve detection sensitivity for impedance.

For an 80-um deep channel, for example, micro-slit patterned may be etched into 30-um of the channel. The micro-slit patterned region may thus allow flow to facilitate high sample throughput conditions while restricting cell or particles to regions of high sensitivity of the electrodes (e.g., 112).

Impedance Contrast Measurement Adjusted-Flow-Rate Channel

In several applications, the flow rate suitable or optimal for high-throughput/continuous microfluidic separation may not be suitable with that for impedance cytometry. Separations often require high flow rate, e.g., to focus flows, whereas the flow rate for impedance cytometry may be highly dependent on the acquisition time, which may require signal averaging to improve signal over noise, e.g., at each measurement frequency of interest.

Figure 7:
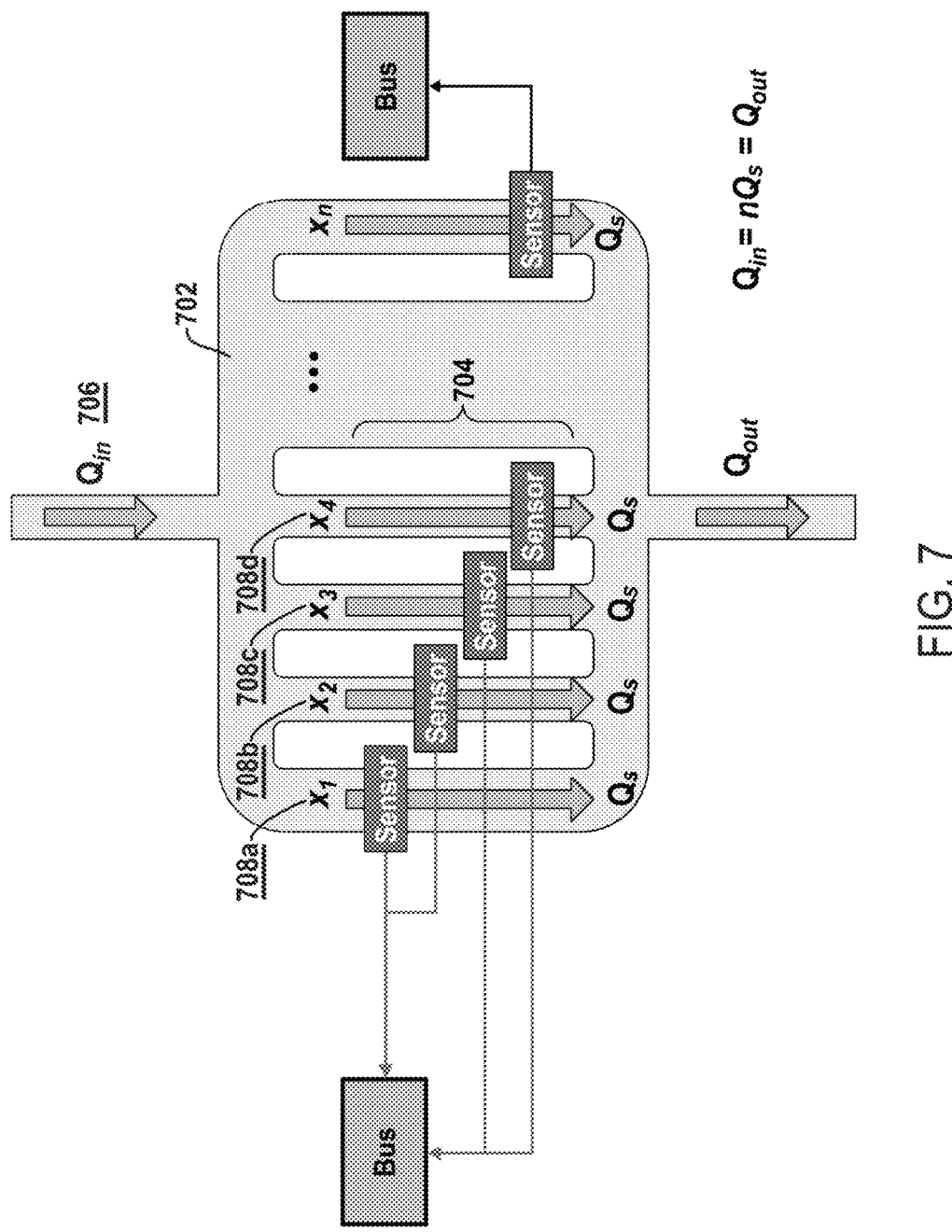
FIG. 7 is a diagram of a networked downstream measurement channel in accordance with an illustrative embodiment.

To address the mismatch in flow rates between separation and for impedance contrast measurement, an exemplary microfluidic chip system may be configured with a network 702 of channels to adjust flow rates by splitting a single channel to many channels to change local fluid velocity. FIG. 7 is a diagram of a networked downstream measurement channel configured for both high flow rate (e.g., in ml/s) and impedance cytometry measurement (e.g., in on the same chip at lower flow rate (e.g., in μL/s).

The network 702 of channels, in some embodiments, comprises a parallel network of microfluidic channels to divide the flow rates based on hydrodynamic resistance values in each channel in which each flow rate is determined by designed channel geometries.

For instance, in FIG. 7, to lower the flow velocity of cells or particles over the impedance sensing region (shown as 704 corresponding to location of electrodes 112), the flow from the separation section (shown as "$Q_{in}$" 706) is split over a network of parallel channels (shown as 708a, 708b, 708c, 708d, and 708e). The network 702 of channels divides the flowrate through each parallel channels in proportion to the hydrodynamic resistance of each channel, as determined by channel geometry (e.g., based predominantly on width and length where depth is fixed).

In some embodiments, and shown in FIG. 7, each parallel channel of the network 702 is configured with a position and measurement sensor (e.g., 112, 302) configured to track cell or particle flow in the particular channel to trigger impedance measurement in the respective channel at the optimal flow rate and to make such impedance measurement. Indeed, the multiplexing features of exemplary microfluidic chip systems as described herein may facilitate the use of high number of parallel channels and corresponding position and/or measurement sensor(s). In some embodiments, a measurement sensor and/or position sensor may be provided for each of channel in the network of channels. Of course, other number of position and/or measurement sensor(s), including for example a single measurement sensor and/or position sensor for all of the channels of the network 702 of channels.

In some embodiments, the sensor (e.g., 112, 302) can be located within the outlet of the branching and/or downstream channel to provide data indicative of a time slice within the collected data set for when the fluid containing the particle or cell is the measurement channel (e.g., within outlet).

Integrated Impedance Analyzer

In another aspect, an integrated impedance analyzer is disclosed that employs a combination of analog and logical circuits along with an ordinary differential analog-to-digital converter (ADC) to interface with the exemplary microfluidic chips. In an implementation, the integrated impedance analyzer is configured in a small board area (<10 sq. inches) that is very economical to fabricate.

Figure 8:
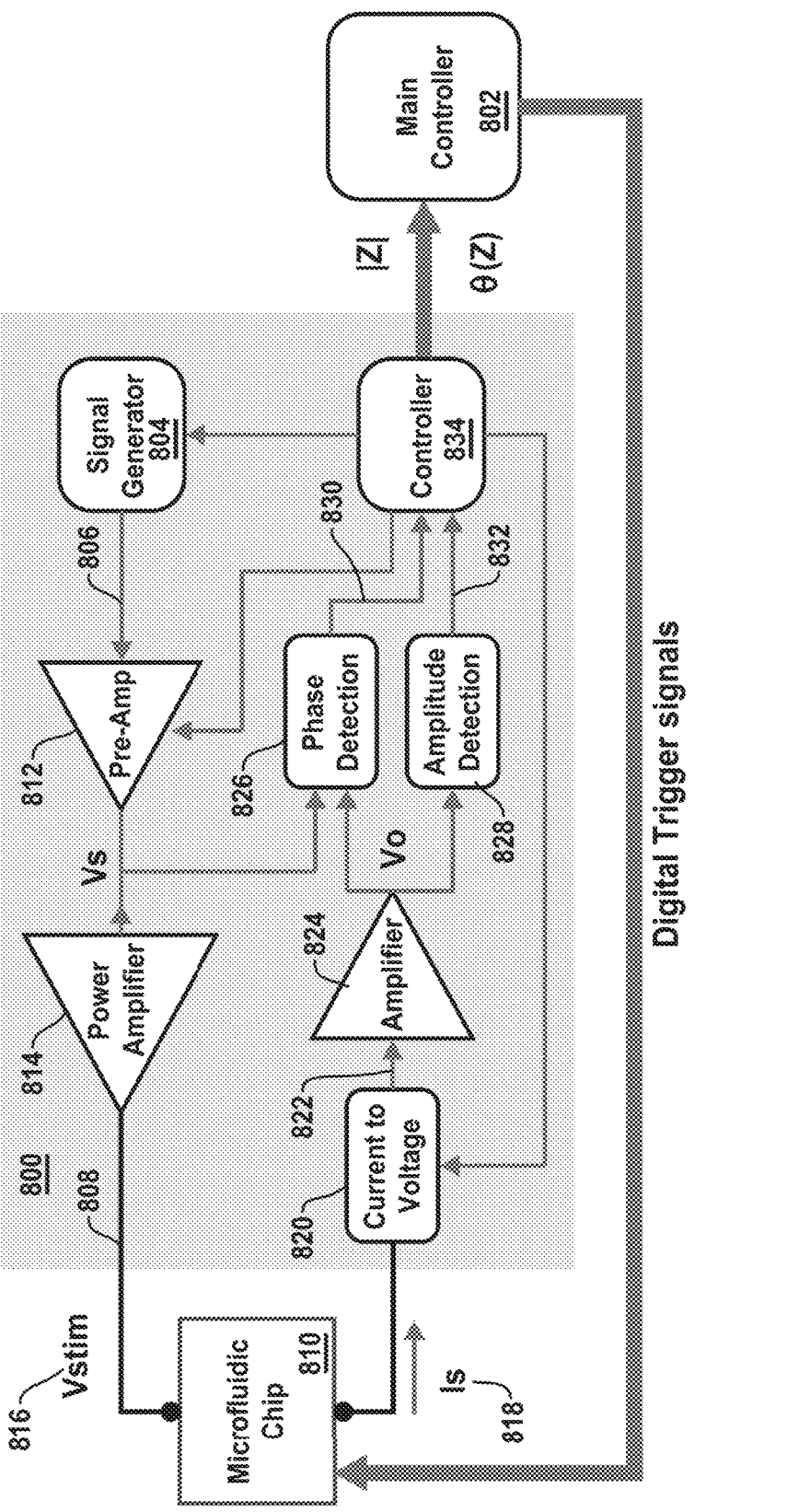
FIG. 8 shows a schematic of impedance measurement, recognition and triggering circuitries that may interface with exemplary microfluidic chip in accordance with an illustrative embodiment.

FIG. 8 shows a schematic of impedance measurement, recognition and triggering circuitries 800 that may interface with exemplary microfluidic chip (e.g., to perform on-chip multiplexed impedance cytometry as described herein in) in accordance with an illustrative embodiment.

In FIG. 8, a controller (shown as "Main Controller" 802) is configured to direct a signal generator unit to generate a signal between about 1 KHz to 10 MHz. In some embodiments, the controller 802 is an external unit that is located in a standalone, external impedance analyzer system. In other embodiments, the controller 802 comprises a micro-controller or processing unit (including FPGA, CPLD, and the like) that is integrated into the circuit system 800.

In FIG. 8, in some embodiments, the signal generator 804 is configured to generate a signal 806 to be applied to the electrodes 112 (shown located in "Microfluidic Chip" 810). The generated signal 806 may be pre-amplified and then power amplified to generate the signal (shown as "Vstim" 808) to drive the electrodes 112 located in the downstream microfluidic channels for impedance magnitude-based contrast and/or impedance phase-based contrast measurements.

In some embodiments, the output amplitude of the signal generator unit (e.g., 804) is amplified through a pre-amplifier circuit (shown as "Pre-Amp" 812) (e.g., configured with adjustable gain) and a power amplifier circuit (shown as "Power Amplifier" 814). In some embodiments, the power amplifier is configured with fixed or programmable gain. For example, where 8 measurements are performed (e.g., for 8 channels), the number of distinct frequencies could be 8 to facilitate frequency-division multiplexing to a single channel and routing. However, two or three sets of frequencies may also be used, e.g., to facilitate frequency-division multiplexing to two or three routing and conversion operations. The fixed frequency, in some embodiments, are not in harmonics to one another.

In some embodiments, the signal generator 804 is configured to sweep a set of distinct frequencies across each of the plurality of electrodes in each respective downstream measurement channel. In other embodiments, the signal generator 804 is configured to generate a fixed set of distinct frequencies to apply to the plurality of electrodes, or a group thereof. The signal generator unit 804 may be external to, or integrated with, the controller. In some embodiments, all frequencies over a specified range and increment are evaluated over the set of channels. To this end, all frequency may be applied, but not the same cell or particle. Such sweep may be used, e.g., to detect or identify optimal frequency ranges for a given type of sample.

In some embodiments, the output 816 of power amplifier 814 is applied across electrodes of the fluidic chip (e.g., in the downstream measurement channel and/or upstream separation channel). The applied output maybe a sinusoidal waveform having an intensity or amplitude in a range between about 0.1 Vpp and about 20 Vpp (Volt peak-to-peak) (e.g., ±5%). The voltage may be configured based on the electrode gap/spacing as well as on the cell/particles of interest. In some embodiments, the stimulation waveform has up a 100 Vpp waveform. In other embodiments, the stimulation waveform has up to a 300 Vpp waveform. The stimulation waveform may have a frequency in the range of about 1 KHz and about 100 MHz.

From the stimulation waveform 816 applied to the electrodes 112, small AC currents (Is) (818), as electrical responses, are generated at electrodes of the fluidic chip. For accurate measurement of a current Is, the acquired signal, in some embodiments, is converted, via a current-to-voltage circuit (shown as "Current to Voltage" 820) to an AC voltage output (822) and then amplified, via an amplifier circuit 824 (shown as "Amplifier" 824) (e.g., from an initial voltage to an amplified voltage "Vo") to a level comparable to the stimulation voltage (shown as "Vs"). The phase difference between Vs and the current-to-voltage converted signal (Vo) may be calculated using a phase detection circuit (shown as "Phase Detection" 826). The amplitude of Vo is also be calculated using a wideband peak detection circuit (shown as "Amplitude Detection" 828). The peak amplitude and phase detection circuits may output the output signals (830, 832) to an internal controller (show as "Controller" 834) for post-processing and error correction. The final output may be the absolute value of Impedance (|Z|) and Phase (θ(Z)), which may be reported or outputted to the main controller (802) or to a remote device for data acquisition and storage.

Indeed, the exemplary integrated impedance analyzer may provide an analog impedance peak magnitude and phase detection system for simultaneous signal measurement as well recognition and triggering of sample manipulation in each channel. A useful aspect of conducting impedance cytometry, in a simultaneous manner within multiple channels, is the capability to acquire and analyze impedance signals such that the recognition routine can be used to trigger sample actuation across the device. In commercially available impedance analyzers and digital oscilloscopes, the phase difference between two signals and their peak values are often calculated by comparing two arrays of data points, with each corresponding to one of the input signals after being digitized using analog-to-digital converters (ADCs). Such method often employ very high-speed ADCs with sampling rates of at least 50-100 times higher than the frequency of input signals to have sufficient data points in each cycle of the signals. Additionally, the data manipulation are often implemented within a fast ASIC or FPGA or CPLD, or the like. The instrumental implementation are complex having high overall cost, especially in configurations where impedance cytometry needs to occur within several tens to hundreds of channel across the device. For example, for the signal frequency of 10 MHz, the ADCs may have to be capable of taking samples with the rate of 1 Giga Hertz, thus limiting commercial impedance analyzers for mega-hertz range cytometry.

Figure 9:
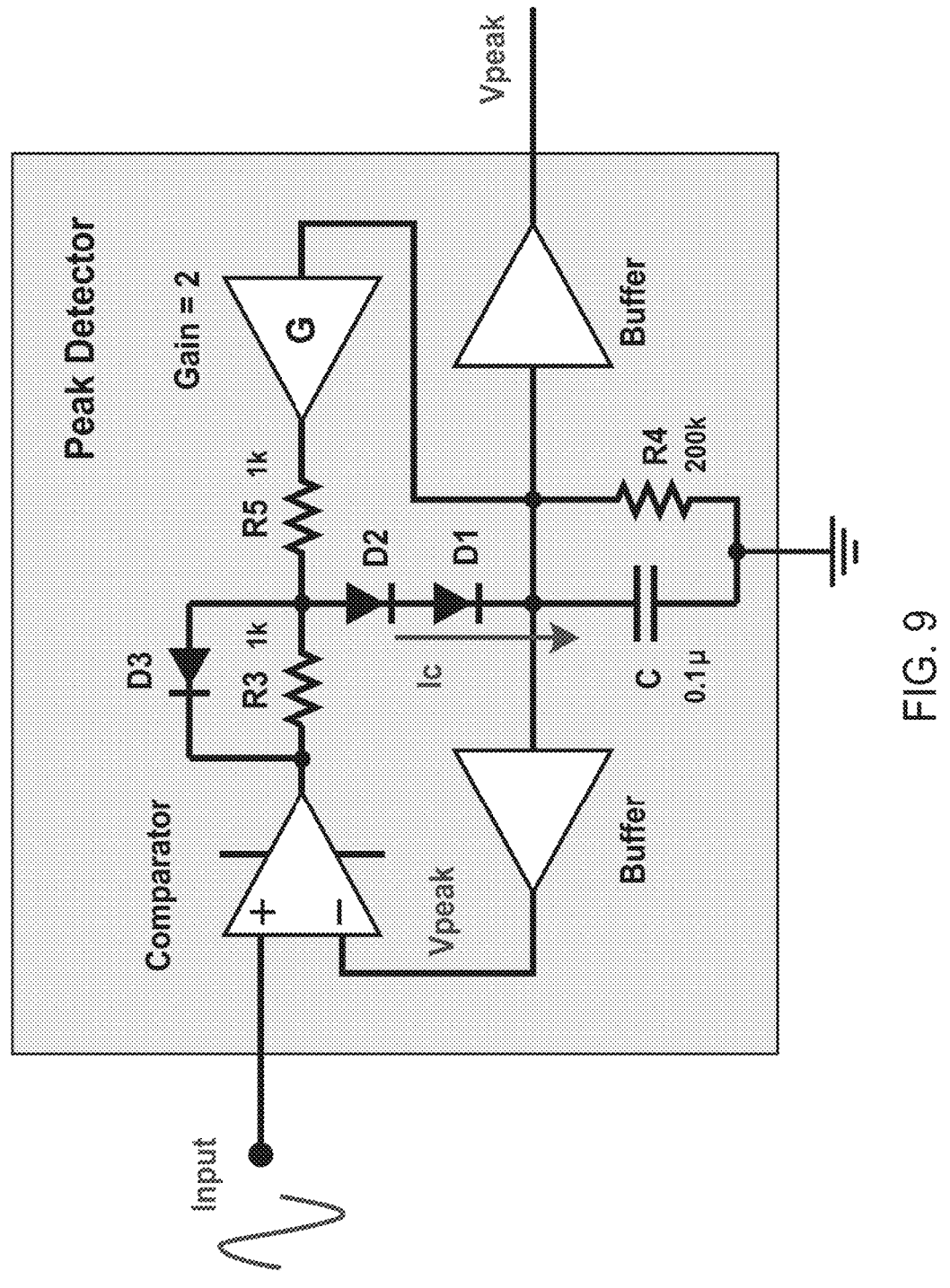
FIG. 9 is a diagram of an example peak detection circuit of FIG. 8 in accordance with an illustrative embodiment.
Figure 10:
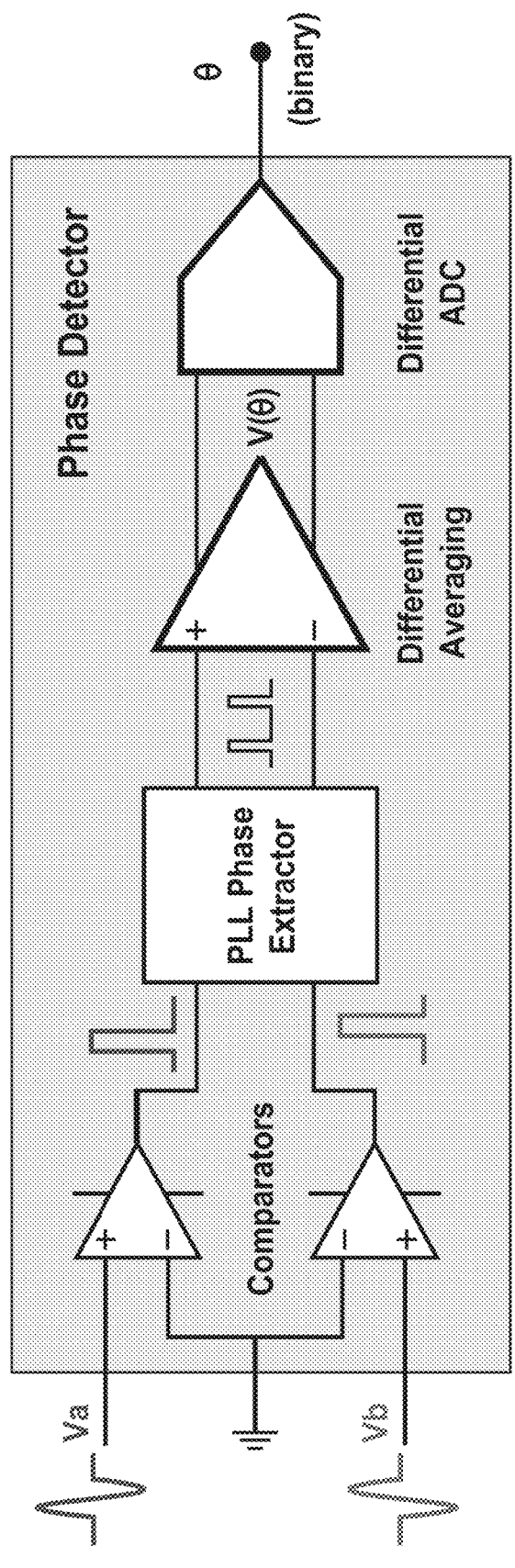
FIG. 10 is a diagram of an example phase detection circuit of FIG. 8 in accordance with an illustrative embodiment.

FIG. 9 is a diagram of an example peak detection circuit (e.g., 826) of FIG. 8 in accordance with an illustrative embodiment. FIG. 10 is a diagram of an example phase detection circuit (e.g., 828) of FIG. 8 in accordance with an illustrative embodiment.

In FIG. 9, the amplitude detection circuit (e.g., 828) may be implemented using a wide-band comparator-based peak detector circuit that is configured for wide amplitude range operation (e.g., 100 mv to 8V) and wide frequency range (e.g., 1 KHz to 50 MHz). The amplitude detection circuit may be implemented for each downstream measurement channel. In some embodiments, the comparator-based peak detection circuit may be configured for accurate amplitude measurement over wide input dynamic range (50 mV-10V) and wide frequency band (100 Hz-10 MHz). The configuration may entail tuning the charging current inside the peak detector to be invariant on the voltage of the charge-holding capacitor, thereby enabling more sensitive comparisons for peak detection. Other optimization and design may be employed.

In FIG. 10, the phase detection circuit (e.g., 828) is configured to provide high accuracy in the phase measurement (error<±0.2°) and amplitude measurement (error<% 1). The measurement may be used for impedance-based recognition and/or quantification of cell electrophysiology as a cell phenotype, e.g., for feedback control to manipulate the sample or cells of interest across the microfluidic device for collection.

Figure 11:
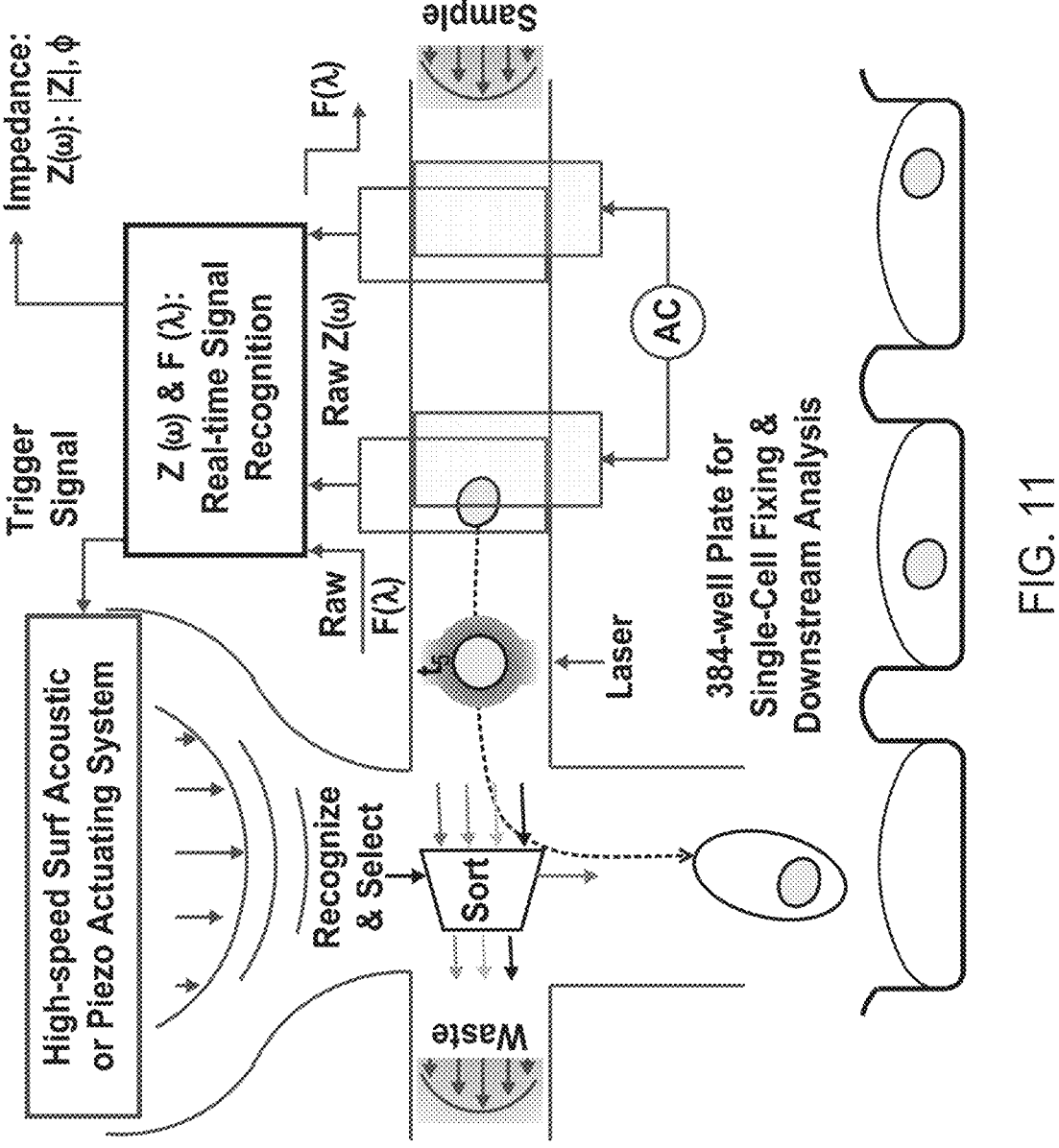
FIG. 11 shows diagram of an example impedance-based sorting operation using the peak and phase detector circuits of FIGS. 10 and 11 (e.g., for inline impedance signal recognition and/or quantification) in accordance with an illustrative embodiment.

FIG. 11 show diagram of an example impedance-based sorting operation using the peak and phase detector circuits of FIGS. 10 and 11, e.g., for inline impedance signal recognition and/or quantification, in accordance with an illustrative embodiment. Indeed, FIG. 11 illustrates a single-cell interrogation process for a focused stream of cells based on impedance swept over a range of frequencies (Z(ω)) that is gated to fluorescence over a range of wavelengths (F(λ)). The aggregated signal may be used, among other things, to facilitate real-time phenotypic recognition to inform down-stream sorting decisions. The embodiment of FIG. 11 is particularly useful, e.g., for selective deposition of cells of a particular phenotype in addressable 384 well-plates for RNA sequencing or fixing for microscopic imaging of subcellular features.

EXAMPLE IMPLEMENTATIONS AND RESULTS

Various aspects of the disclosed technology may be still more fully understood from the following description of example implementations and corresponding results and the images of FIGS. 12-16. Some experimental data are presented herein for purposes of illustration and should not be construed as limiting the scope of the disclosed technology in any way or excluding any alternative or additional embodiments.

Impedance Magnitude and Phase Contrast for Quantification of Cell Electrophysiology In an aspect, an exemplary microfluidic chip system may be configured for impedance phase contrast in which phase impedance characteristics (solely or along with magnitude impedance) are used to quantify alterations in electrophysiology of the cell interior. In some embodiments, the phase impedance characteristics are used as a metric to gauge variations in the high and low frequency impedance phase responses to quantify alterations in electrophysiology of the cell interior, e.g., due to cytoplasm conductivity arising from nucleus size or permittivity due to organelles in the cytoplasm. Single-cell impedance cytometry as described herein is a label-free microfluidic technique where the electrical impedance of single cells flowing at high throughput (300-400 cells/s) past microelectrodes is detected based on the disruption in current flow, under an AC electric field over a range of frequencies (0.5-50 MHz). Sec, e.g., Spencer, D. et al., "High accuracy particle analysis using sheathless microfluidic impedance cytometry," Lab on a Chip, 2016. 16(13): p. 2467-2473, which is incorporated by reference herein in its entirety.

While the impedance at low frequencies (~0.5 MHz) is determined by cell volume, the impedance magnitude and phase at successively higher frequencies may offer information on cell electrophysiology, such as its membrane capacitance (2-5 MHz) and cytoplasmic conductivity (>10 MHz). Usually, impedance distinctions are carried out based on a metric called electrical opacity, which is the impedance magnitude at any given frequency normalized to its value at low frequency to account for size differences. However, this metric is usually unable to provide information on alterations in the cell interior, due to organelle structure, including mitochondria in the cytoplasm and biomolecular composition in the nucleus.

To accomplish these distinctions, the exemplary microfluidic chip system may employ a normalized impedance phase contrast metric that depends on the cell permittivity to conductivity ratio.

To demonstrate this, a study was conducted on a set of patient-derived pancreatic tumor cell types (from Pancreatic ductal adenocarcinoma (PDAC)) of varying tumorigenicity expanded in mice as xenografts. Specifically, the study compared PDAC cells obtained from metastatic versus primary tumor sites of KRAS mutant genotype, as well as those from primary tumors of KRAS wild-type genotype, to explore whether subcellular electrophysiology determined using impedance phase contrast can be used as the phenotype to differentiate between the respective cell types. Metastatic PDAC cells was shown to exhibit the greatest level of tumorigenicity, while tumorigenic primary PDAC cells are predominantly of KRAS mutant rather than of KRAS wild-type genotype, which has been previously reported in Bryant, K. L., J. D. Mancias, A. C. Kimmelman, and C. J. Der,

19

*KRAS: feeding pancreatic cancer proliferation.* Trends in Biochemical Sciences, 2014. 39(2): p. 91-100, which is incorporated by reference herein.

Results

Table 1 shows Characteristics of PDX PDAC tumors and cells. In Table 1, the term "Met" refers to metastatic samples, "Pri" refers to primary sample, "mut" refers to mutant samples, "wt" refers to wild-types, and "NT" refers to not-tested.

TABLE 1

| | | KRAS | Codon mutation details‡ | | |
|---|---|---|---|---|---|
| Tumor | Clinical | status | G12 | G13 | O61 |
| T608 | met | mut | aa12(G→ | Non | Non |
| T366 | met | mut | aa12(G→ | Non | Non |
| T395 | pri | mut | aa12(G→ | NT | NT |
| T449 | pri | mut | aa12(G→ | NT | NT |
| T188 | pri | wt | None | NT | NT |
| T738 | pri | wt | None | Non | Non |

Figures 12A, 12B, 12C:
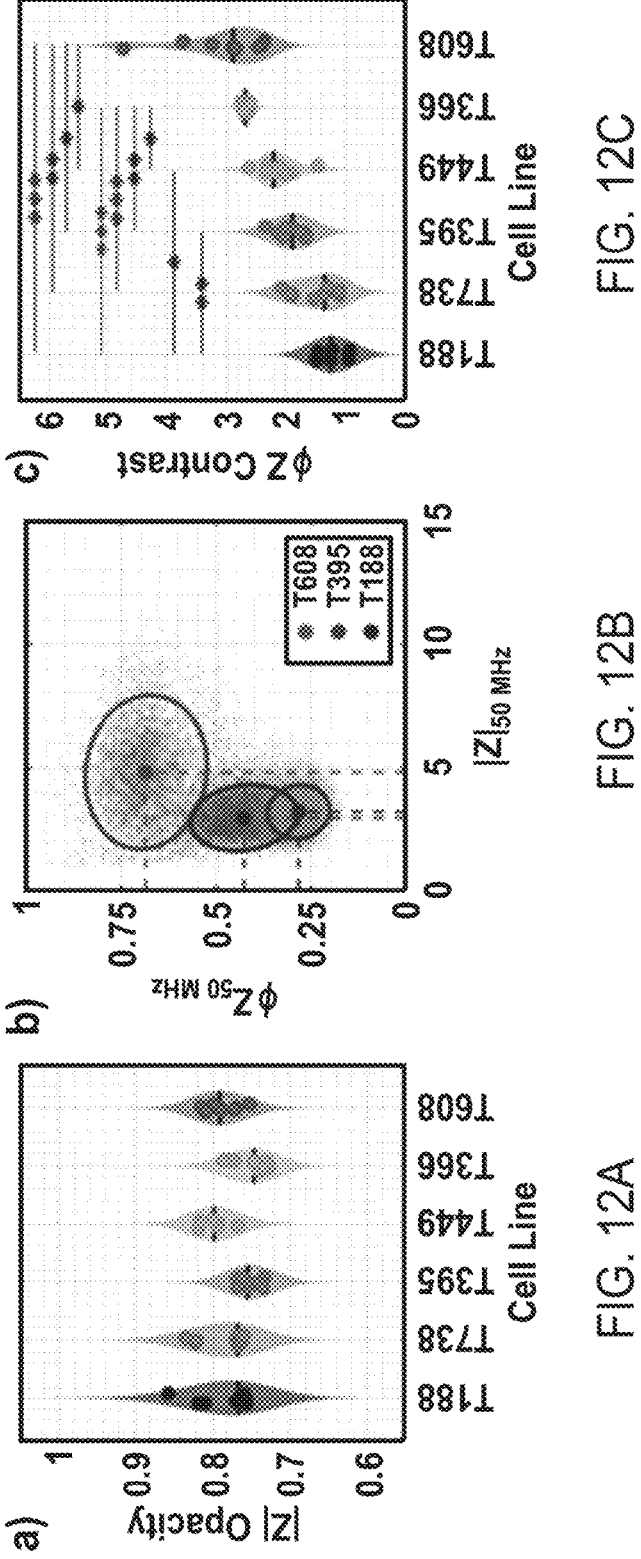
FIGS. 12A, 12B, and 12C show electrical properties data for tumor (PDAC) samples calculated using multi-frequency impedance contrast data in accordance with an illustrative embodiment.

FIGS. 12A, 12B, and 12C show electrical properties data for tumor (PDAC) samples calculated using multi-frequency impedance contrast data in accordance with an illustrative embodiment. In FIG. 12A, magnitude opacity of the samples are shown, and FIG. 12C shows impedance phase contrast values for PDAC cells.

Violin plots in FIG. 12C show the population distribution for each cell line (color-coded) with median values (solid line). Overlaying markers show individual means (n=9) for all cell lines. Statistical significance (post Bonferroni correction for multiple comparisons) are shown for several p-value levels, including *p≤0.003 level; p≤0.0007 level; *p≤0.00007 level.

FIG. 12B show impedance phase (φZ) being plotted against magnitude (|Z|) for metastatic mutant T608, primary mutant T395, and primary wild-type T188 at 50 MHz. Circular markers (color-coded) with dashed red lines show population means and annotated confidence ellipses, which contain ~50% of detected events. Each scatter plot shows ~6000 plotted events.

Indeed, the use of ratio of intermediate to lower frequency impedance magnitude ($|Z|_{2\ MHz}/|Z|_{500\ kHz}$) can be used to estimate the cell membrane capacitance for each cell line based on the |Z| opacity, with no statistically significant difference identified (FIG. 12A). Impedance |Z| opacity has been described in Gawad, S. et al., "Micromachined impedance spectroscopy flow cytometer for cell analysis and particle sizing," Lab on a Chip, 2001. 1(1): p. 76-82. Despite this, peak reactance has been observed to occur at slightly different frequencies for each tumor cell type, demonstrating variance between the actual cell membrane capacitance values. At frequencies above peak reactance (>10 MHz) where the dielectric properties of the cell interior dominate the impedance response, the largest difference between samples is visible in the phase response at 50 MHz (FIG. 12B). Such cell interior dominate the impedance response as had been reported in Gawad, S., L. Schild, and P. Renaud, "Micromachined impedance spectroscopy flow cytometer for cell analysis and particle sizing," Lab on a Chip, 2001. 1(1): p. 76-82, which is incorporated by reference herein.

Using the ratio of the impedance phase at a high frequency to that at a frequency below the peak reactance (e.g., $φZ_{50\ MHz}/φZ_{500\ KHz}$; FIG. 12c), the phase response of the cell interior and cell membrane can be compared to calculate a metric referred to as the φZ contrast, also referred to herein as the phase impedance contrast. The phase impedance contrast parameter, in some embodiments, aggregates the low and high frequency phase differences into a contrast term that describes the frequency-dependent electrophysiology of different cell components. By using phase at a low frequency, such as 500 kHz, to effectively normalize phase signals at higher frequencies, both permittivity and conductivity differences at membrane and interior level between samples may be considered and used in the quantification of cells or particles via phase impedance contrast.

Figure 13:
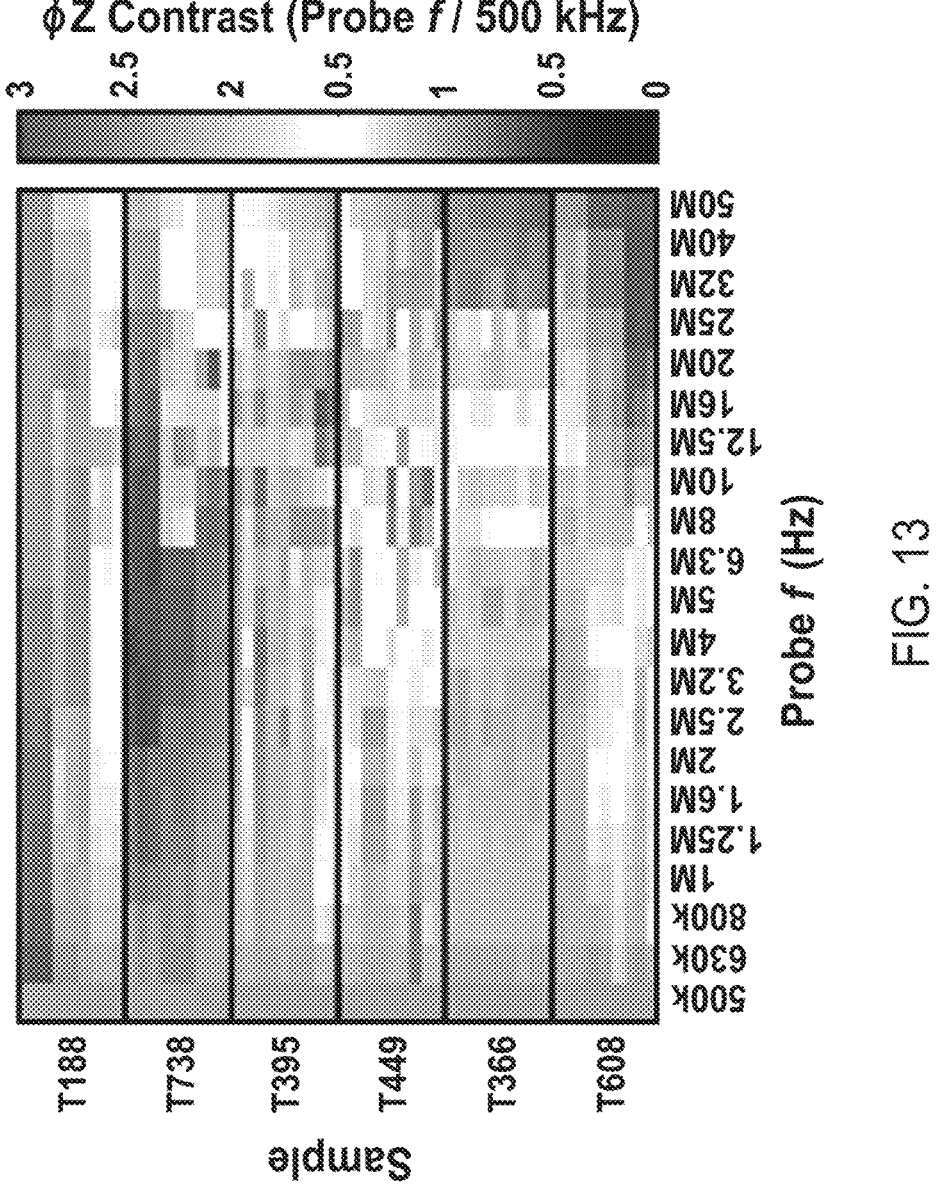
FIG. 13 is a diagram showing phase contrast spectra for tumor cell discrimination in accordance with an illustrative embodiment.

FIG. 13 is a diagram showing phase contrast spectra for tumor cell discrimination (e.g., for PDAC samples). For each detected event, phase at the varying probe frequency (500 k-50 MHz) is divided by phase at the low reference frequency (500 kHz) to calculate phase contrast across three frequency decades. The color map shows average phase contrast across the probe frequency range for each sample (n=9) of the cell lines; 0 (black)=low phase contrast, 3 (blue=high phase contrast.

In FIG. 13, the ratio of the varying probe frequency to the low reference frequency φZ data are plotted, i.e., $φZ_{probe\ frequency}/φZ_{500\ kHz}$. The φZ contrast is greatest at high frequencies, which justifies the use of 50 MHz data for φZ contrast calculation (as suggested per FIGS. 12B and 12C). A high φZ contrast indicates larger disparity between the phase shift at high vs low frequency, for example, due to the presence of capacitive cell components near the cell exterior, the conductive portions of the cell interior, or a combination of both factors.

Indeed, tumor cells derived from liver metastases (T608 and T366) has been found to exhibit phase impedance (φZ) contrast with a minimum of 1.25× greater than primary tumor-derived samples of the same KRAS mutant genotype (T395 and T449) and a minimum of 2× greater than primary tumor-derived samples of KRAS wild-type genotype. Specifically, T608 (met mut) shows 2.3× larger phase impedance (φZ) contrast than T188 (pri wt), while T395 (pri mut) shows 1.5× larger φZ contrast than T188 (pri wt). Furthermore, there were no statistical differences in φZ contrast between tumor cells with same origin and KRAS mutant genotype, i.e., T608 versus T366, T395 versus T449, and T188 versus T738 (FIG. 12C). On average, PDAC cells originally isolated from liver metastases (T366 and T608) had a ~1.4× greater phase impedance (φZ) contrast than pancreas-derived samples of the same KRAS mutant genotype (T449 and T395; see FIG. 12C); with these differences being statistically significant (p≤0.003; FIG. 12C).

In a genomic study with a cohort of 13 PDAC patients, Campbell et al., "The patterns and dynamics of genomic instability in metastatic pancreatic cancer," Nature, 2010. 467(7319): p. 1109, found that multiple subclones within the primary tumor undergo mutations and/or rearrangements, which enhance their metastatic capability to colonize at a secondary site. In another study using 27 tumors, Collisson et al., "Subtypes of pancreatic ductal adenocarcinoma and their differing responses to therapy," Nature medicine, 2011. 17(4): p. 500 identified that higher expression of mesenchymal genes was associated with poorer prognosis in PDAC patients. Le Large et al., "Key biological processes driving metastatic spread of pancreatic cancer as identified by multi-omics studies," Seminars in cancer biology, 2017. 44: p. 153-169 concluded that in the work of Collisson et al., it is highly likely that poor patient prognosis was due to increased mesenchymal gene expression causing a higher occurrence of epithelial-mesenchymal transition (EMT)

and, subsequently, greater metastatic potency. While finding of the instant study that tumor cells derived from a secondary site had greater $\phi Z$ contrast than those derived from the pancreas, further validation may be useful as this observation may indicate that metastatic PDAC tumors incorporate cellular-level changes which manifest as a distinct electrical phenotype. Given that four out of five of PDAC patients died due to the development of metastases in reported studies, there is a benefit for markers which enable rapid identification of EMT-induced cellular and subcellular changes to help clinicians predict patient survival in prognostic studies and help in therapy selection.

Example Method

In the PDAC study, an electrode design configured with the impedance cyclometric methodology as described herein was defined on two 4" glass wafers (D263, Schott) using a photomask (Photosciences) to pattern AZ 1505 (Microchem), before a Ti/Au (20 nm/200 nm) layer was deposited by e-beam evaporation (CHA-50, CHA). Upon lift-off in acetone with ultrasonication, SU-8 3050 (Microchem) was spun onto one of the identical substrates to give a film thickness of ~30 μm for use as the microchannel layer. Upon UV exposure and resist development, the two wafers (one containing the SU8 structures) with facing gold microelectrodes ~45 μm wide (with a spacing of ~15 μm) were aligned and brought into contact (EVG 620, EV Group). Thermal bonding of the wafer complex was performed at 180° C. using a bonding pressure of 10 kN for 1 h with vacuum established at 5900 mbar (EVG 510, EV Group). The bonded wafer complex was cut into individual dies using a dicing saw (DAD3220, Disco). Fluidic access holes were drilled using a CO2 laser (VSL 3.5, Versa). Chips were assembled in a 3D printed holder which housed all fluidic and electrical connections.

To prepare derivation of patient-derived cell lines and lentiviral transduction, PDAC tumor samples MAD 12-188, 09-366, 12-395, 14-449, 08-608 and 08-738 were generated from remnant human tumor surgical pathology specimens collected. Tumors were propagated orthotopically on the pancreata of immunocompromised mice and cell lines were established, as previously described [17, 18]. Cells were transduced with firefly luciferase lentivirus (KeraFAST), selected using puromycin and maintained in RPMI1640 with 10% FBS and 2 mM glutamine. Fresh cell aliquots were thawed, propagated, and used for experiments.

To prepare the samples used in the PDAC study, confluent cells in Dulbecco's Modified Eagle Medium (DMEM) [Gibco, USA] were aspirated, washed in PBS and exposed to 0.5% trypsin for 5 mins at 37° C. Cells were resuspended in 5 mL DMEM and centrifuged at 300 g for 10 mins. DMEM was aspirated, the cell pellet was resuspended in 1×PBS, 500 mM EDTA, and 0.5% Bovine Serum Albumin and filtered through a 100 μm cell strainer. Cells were then counted with a hemocytometer and diluted to a concentration of ~2×105 mL-1. Reference particles (7 μm diameter) at a concentration of ~1.2×105 were added to the buffer to account for system non-linearities and inter-measurement variability. An aliquot containing cells suspended for 2 mins 1:1 in a solution of trypan blue (Fisher Scientific) and were counted (100 cells) to ensure that sample viability was ≥90%. A total of n=9 samples were measured from three separate batches of each cell type.

For impedance cytometry evaluation in the PDAC study, each sample was introduced to the microfluidic channel (~30 μm tall by ~60 μm wide) at a flow rate of 100 μL min-1

(neMESYS, Cetoni). Sinusoidal voltages at three discrete frequencies were applied to the top electrodes using a digital impedance analyzer (HF2IS, Zurich Instruments).

Figure 14A:
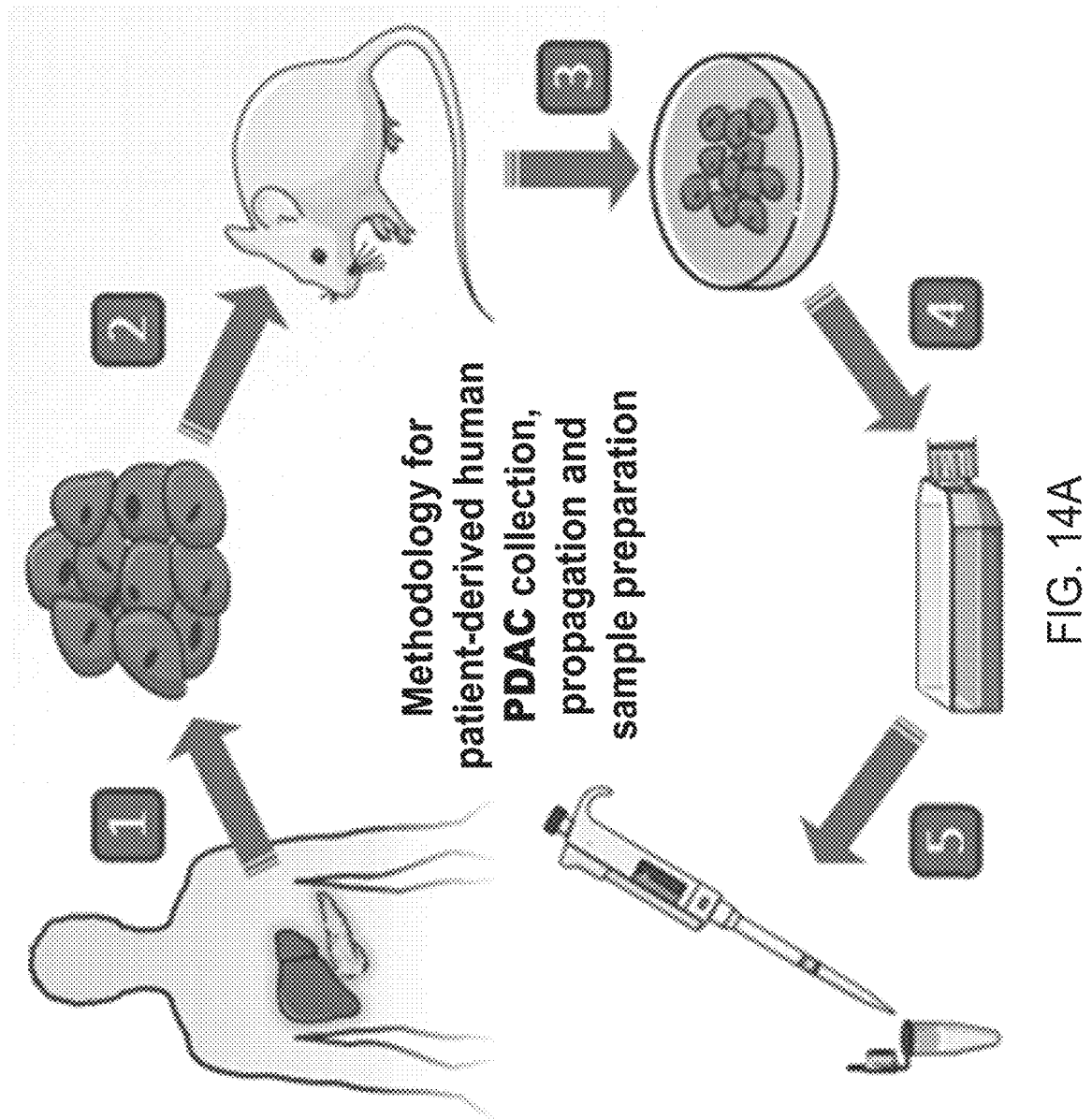
FIGS. 14A and 14B show an impedance cytometry evaluation conducted on a set of patient-derived pancreatic tumor cell types in accordance with an illustrative embodiment.
Figure 14B:
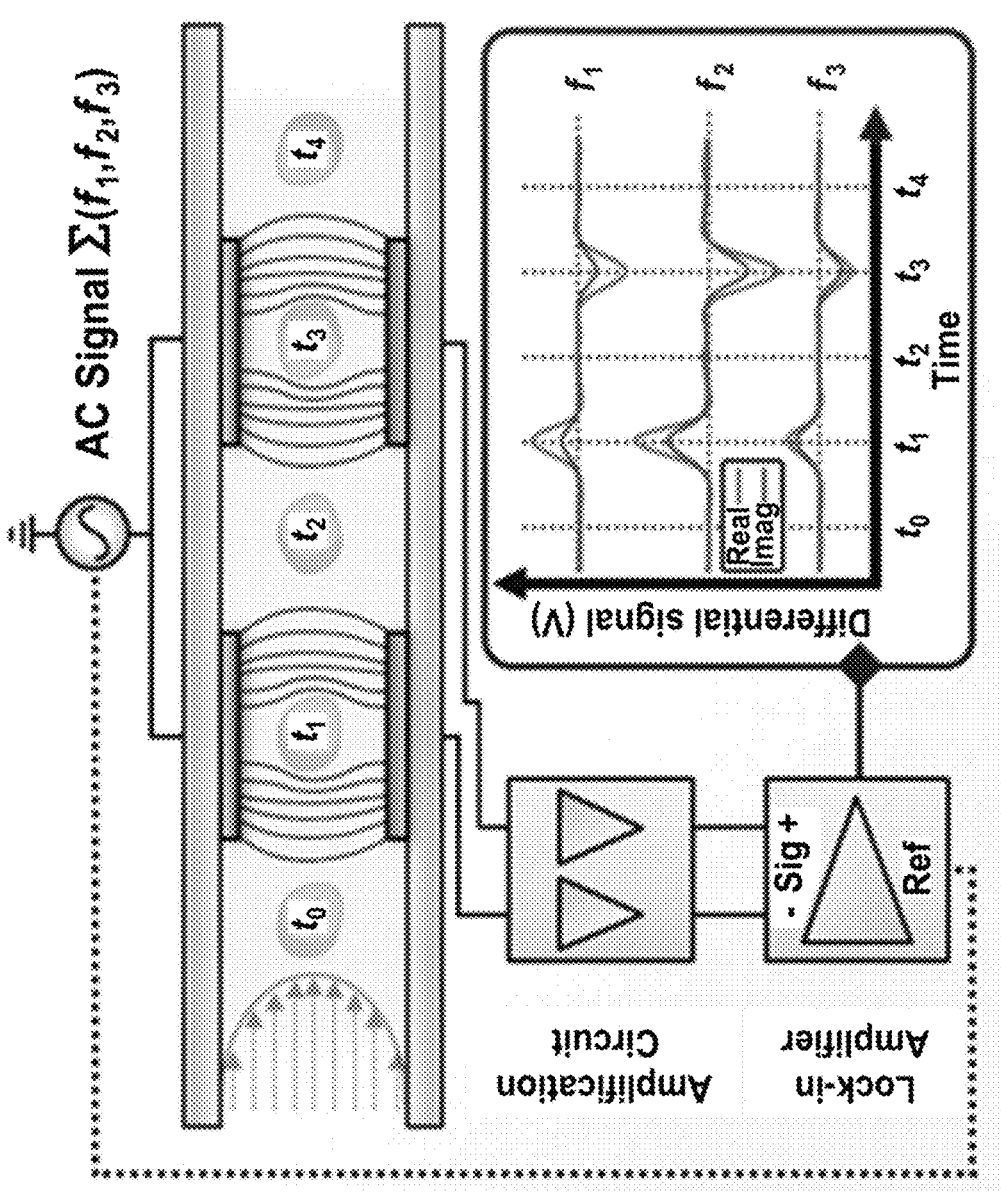

FIGS. 14A and 14B show an impedance cytometry evaluation conducted on a set of patient-derived pancreatic tumor cell types (also referred to as a "PDAC study") in accordance with an illustrative embodiment.

In the PDAC study, a voltage of 2 Vpp was applied at each signal frequency. The reference frequency was applied at 18.3 MHz, the probe frequency was swept over 24 discrete frequencies between 250 kHz-50 MHz, and the third frequency was applied at 500 kHz. The current flowing through the bottom electrodes was converted to voltage using a current amplifier (HF2TA, Zurich Instruments) which had a gain factor of 1000. Lock-in amplification was used to separate the real and imaginary signal components at each frequency, from which impedance magnitude and phase are derived.

As part of the PDAC study, dielectrophoretic analysis was conducted to validate the electrophysiology differences between the PDAC cell types observed by impedance cytometry. PDAC cells were prepared as described previously, but instead resuspended in isotonic dielectrophoresis (DEP) buffer (8.8% sucrose, 0.5% BSA solution in DI water), with the conductivity adjusted to 0.15 S m-1 by titrating back in 1×PBS. Cell concentrations were adjusted to 1×106 cells mL-1 and counted by hemocytometer to confirm concentration. Cells were analyzed using a 3DEP analyzer (DEPtech, UK) as described previously [19], [20]. Data were analyzed using MATLAB (R2018b).

While impedance responses measure alterations in the frequency response of current due to presence of cells between the electrodes, DEP frequency responses are based on field-induced translation of polarized cells within a spatially non-uniform electric field [30-32], either towards the field by positive DEP (pDEP) or away from the field by negative DEP (nDEP). Cell size estimation from the single shell model agreed with cell size estimation from impedance cytometry.

As part of the PDAC study, flow cytometry was performed. Flow cytometry was carried out at the University of Virginia Flow Cytometry Core Facility using a FACS Calibur flow cytometer (BD Biosciences). Data were exported as standard FCS files and the forward and side scattered light (FSC and SSC) signals were analyzed using MATLAB (R2018b).

For the data analysis, code was written in MATLAB (R2018b) for data processing and statistical analysis. The impedance signal of each tumor cell was normalized relative to the frequency-independent impedance response of the polystyrene beads. Tumor cell populations were gated from smaller debris and larger reference beads using normalized impedance data gathered at the reference frequency (18.3 MHz). The normalized impedance response of gated cells at each frequency was then plotted and analyzed (Fig S1). Processed datasets were used to perform statistical analyses (MATLAB R2018b). Independent datasets were tested for normality using a one-sample Kolgomorov-Smirnov test. Normally distributed samples were subsequently compared using a One-way ANOVA, and multiple two sample Students' t-tests. Non-normally distributed data were compared using the Kruskal-Wallis test followed by multiple Wilcoxon Rank Sum tests. Statistical significance levels were adjusted using Bonferroni correction for the multiple comparisons performed.

As part of the PDAC study, bioinformatics analysis was conducted to identify the factors which may have contributed to the described electrophysiological differences. Gene expression profiling was performed on PDX PDAC tumors from all samples. Microarray data were generated using the GeneChip Human Gene 2.0 ST Array Chipset and analyzed in an R/Bioconductor programming environment. Raw gene expression data were preprocessed using the pd.hugene.2.0.st the oligo [PMID: 20688976] packages. Differential expression analysis and gene set variability analysis were implemented using the limma [PMID: 25605792] and gsva [PMID: 23323831] packages. A gene set collection of gene ontology terms describing molecular function (GO: MF) were obtained from the Molecular Signature Database (MSigDB) [PMID: 21546393]. Comparisons were made between the four KRAS mutant samples and two KRAS wild-type samples. Significant phenotypic differences between the respective cell types based on their electrophysiology were observed.

PDAC Discussion

Pancreatic ductal adenocarcinoma (PDAC) is the most common malignant cancer of the pancreas and is among the leading causes of cancer-related deaths [1]. The disease initially manifests as an epithelial tumor which arises from the cells lining the ducts of the pancreas, but most fatalities occur due to metastases [2]. Given that the 5-year survival rate for PDAC is 8% [3] and disease incidence is predicted to increase by 55% in the next 20 years [4], PDAC is a growing health concern, especially due to the lack of specific biomarkers which correlate to the tumorigenicity of PDAC cells [5]. While a significant majority of PDAC patients (~95%) exhibit KRAS mutations [6] that activate oncogenic proteins [7], tumorigenicity cannot be assessed solely based on specific mutations. Since the mechanisms by which different KRAS mutations influence the overall cell structure and consequent tumor aggressiveness are poorly understood, it is of great interest to explore phenotypic differences between different PDAC tumor cell types. Using patient-derived PDAC cells of varying tumorigenicity expanded in mice as xenografts, a PDAC study was conducted to compare PDAC cells obtained from metastatic versus primary tumor sites of KRAS mutant genotype, as well as those from primary tumors of KRAS wild-type genotype, to explore whether subcellular electrophysiology can be used as the phenotype to differentiate between the respective cell types. Metastatic PDAC cells exhibit the greatest level of tumorigenicity, while tumorigenic primary PDAC cells are predominantly of KRAS mutant rather than of KRAS wild-type genotype [6].

The biophysical characterization of single tumor cells can yield phenotypic markers which correlate with cancer onset and progression [8, 9]. Cell electrophysiology represents an aggregate of biophysical properties that are influenced by genomic and micro-environmental factors, both of which play critical roles in tumor development. Hence, electrophysiological analysis can provide phenotypic markers for quantifying the influence of systems-level biological interactions on individual tumor cells. However, to obtain clinically relevant information, single-cell measurements at truly high throughput levels (i.e., thousands of cells) are necessary for enabling these subtle phenotypic distinctions, while allowing for statistically relevant cytometry of the relative variations within the population of interest. Single-cell impedance cytometry is a label-free microfluidic technique wherein the electrical impedance of single cells flowing at high throughput (300-400 cells/s) past microelectrodes is detected based on the disruption in current flow, under an AC electric field over a range of frequencies (0.5-50 MHz) [10]. While the impedance at low frequencies (~0.5 MHz) is determined by cell volume, the impedance magnitude and phase at successively higher frequencies offer information on cell electrophysiology, such as its membrane capacitance (2-5 MHz) and cytoplasmic conductivity (>10 MHz). Impedance cytometry has been used previously to analyze various cell types, including stem cells [11], waterborne parasites [12] or parasite-infected red blood cells [13]. In prior work, following immuno-capture of circulating tumor cells in blood that originate from PDAC tissues [14],[15], the released tumor cells were distinguished from leukocytes that express similar markers using low frequency (40 kHz) impedance measurements, which are based on size rather than electrophysiology differences. In other work, whole-body impedance measurements have been used to predict disease outcome on pancreatic cancer patients [16]. However, all this prior PDAC work is not focused on phenotypic distinctions between tumor cell types, using single-cell methods that are sensitive to heterogeneity.

In contrast to these prior work, the instant PDAC study reported on high-throughput multi-frequency single-cell impedance cytometry applied to different patient-derived PDAC tumor cell types, for enabling electrophysiology-based phenotypic distinctions between cells with known differences in tumorigenicity. Single-cell cytometry is beneficial to obtain the necessary sub-cellular sensitivity for quantifying the electrophysiology distinctions, whereas high-throughput measurements (>5000 cells per population) are beneficial to ensure statistically relevant variations between the respective populations. Based on a normalized impedance phase metric that depends on the cell permittivity to conductivity ratio, the instant PDAC study showed systematic differences in electrophysiology of the cell interior as a function of tumorigenicity of the cell population and use genetic analysis to explore some of the molecular processes that likely contribute to the measured subcellular electrophysiological differences. These systematic electrophysiology-based differences could provide a label-free marker for stratification of PDAC cells, as well as other diseased cells, based on their tumorigenicity and enable strategies for their selective dielectrophoretic isolation from heterogeneous samples, which would eventually aid in prognostic studies on patient survival and therapy selection.

Based on high-throughput single-cell impedance cytometry measurements using patient-derived PDAC cell types of varying tumorigenicity in the PDAC study, significantly higher levels in impedance phase signal for cell types were obtained from metastatic versus from primary tumor sites of the same KRAS mutant genotype, while cells from primary tumors possessing KRAS mutations exhibited higher impedance phase signal versus those lacking KRAS mutations. Since impedance phase varies in proportion to cell permittivity and inversely with cell conductivity, these observations were consistent with an upshifting in the crossover frequency to positive dielectrophoresis that is associated with lower cell capacitance, and a decrease in positive dielectrophoresis levels due to lower interior conductivity for metastatic versus primary PDAC cell types and for those with versus without KRAS mutations. Since the most significant electrophysiological differences were observed between tumor cells obtained from KRAS wild-type versus KRAS mutant genotype (including primary and metastatic tumors), the gene expression data were stratified along these categories to suggest oncogenic KRAS-driven processes that may potentially be responsible for the detected variation in electrophysiological phenotype. Single-cell impedance cytometry could be used to rapidly provide clinicians with information about the tumorigenicity and/or metastatic potential of an individual's PDAC for tailoring therapies and prognoses.

Single-Cell Impedance Cytometry Discussion

AC electrokinetics refers to the behavioural study of particles subjected to a frequency-dependent excitation signal in the form of an AC electric field. In a single-cell impedance cytometry system, the AC signal originates from pairs of parallel facing electrodes within the microfluidic chip (e.g., as described in relation to FIGS. 1 and 2). This complex signal ($\tilde{U}$) generates an electrical current ($\tilde{I}$), from which the complex impedance ($\tilde{Z}$) can be calculated per Equations 1 and 2.

$$\tilde{Z}(j\omega) = \frac{\tilde{U}(i\omega)}{\tilde{I}(i\omega)} = \text{Re}(\tilde{Z}) + \text{Im}(\tilde{Z}) \qquad \text{(Equation 1)}$$

In Equation 1, $\text{Re}(\tilde{Z})$ and $\text{Im}(\tilde{Z})$ are the Real and Imaginary parts of the complex impedance, respectively, i is the unit imaginary number ($i^2 = -1$), and $\omega$ is the angular frequency (rad $s^{-1}$). The real part is commonly referred to as resistance while the imaginary part is termed reactance. As for the magnitude ($|\tilde{Z}|$) and phase ($\phi\tilde{Z}$) components of the complex impedance, they can be calculated through Equations 2 and 3.

$$|\tilde{Z}| = \sqrt{\text{Re}(\tilde{Z})^2 + \text{Im}(\tilde{Z})^2} \qquad \text{(Equation 2)}$$

$$\phi\tilde{Z} = \arctan\left(\frac{\text{Im}(\tilde{Z})}{\text{Re}(\tilde{Z})}\right) \qquad \text{(Equation 3)}$$

In the case where only the conductive medium is found within the parallel facing electrodes (e.g., annotated as $t_0$, $t_2$ and $t_4$ in FIG. 14), the system can be modelled as a dielectric material with unbound charge, i.e., with permittivity $\varepsilon$ and conductivity $\sigma$. Physically, the conductivity component is the unbound charge and the permittivity is the ability of the dielectric to store energy as movement of the bound charge. The complex impedance of the system relates to the complex impedance of the medium and can be expressed in Equation 4.

$$\tilde{Z}_{medium} = \frac{1}{j\omega\tilde{C}_{medium}} \qquad \text{(Equation 4)}$$

The capacitance of the medium may be calculated by Equation 5.

$$\tilde{C}_{medium} = \tilde{\varepsilon}_{medium}\frac{A}{d} \qquad \text{(Equation 5)}$$

In Equation 5, A is the area and d the thickness of the dielectric, and $\tilde{\varepsilon}$ is the complex permittivity of the dielectric, which represents the frequency dependence of the material permittivity, which can be calculated using Equation 6.

$$\tilde{\varepsilon}_{medium} = \varepsilon_0\varepsilon_{medium} - i\frac{\sigma_{medium}}{\omega} \qquad \text{(Equation 6)}$$

In Equation 6, $\varepsilon_0$ is the constant vacuum permittivity ($8.85\times10^{-12}$ F $m^{-1}$), $\varepsilon_{medium}$ is the dimensionless number referring to the relative permittivity of the medium and $\sigma_{medium}$ is the conductivity of the medium (S $m^{-1}$).

In the case where a particle (e.g. a cell) is present in the suspending medium within the parallel facing electrodes (annotated as $t_1$ and $t_3$ in FIG. 14), the impedance of system corresponds to the mixture of particle and medium and can be calculated per Equation 7.

$$\tilde{Z}_{mix} = \frac{1}{j\omega\tilde{C}_{mix}} \qquad \text{(Equation 7)}$$

In Equation 7, $\tilde{C}_{mix}$ is the complex capacitance of the system.

Signal Acquisition Discussion

In certain embodiments of single-cell impedance cytometry, the detection region consists of pairs of parallel facing gold electrodes, fabricated within the microfluidic channel. The sample is diluted adequately so that it is unlikely for more than a single particle to pass the detection region between the electrodes at any one time. The AC signal ($\tilde{U}$) is applied to the top electrodes; and the difference in current ($\tilde{I}$) flowing through the channel is acquired by the bottom electrodes and measured by the detection circuit. The impedance changes caused by the presence of a particle between the electrode pair are then translated into a change in the current signal being measured, as the current path becomes disturbed. Thus, the complex impedance of the system ($\tilde{Z}$) is inferred from the measured current. The current flowing through each bottom electrode is converted to voltage using transimpedance amplifiers. Lock-in amplification then separates the real and imaginary parts of the signal at each applied frequency.

In the case of a cell or polymer bead, for instance, their inherent insulating properties at low frequencies cause an increase in impedance, leading to a drop in measured current. This in turn results in a positive peak, for the first pair of electrodes, and the opposite for the second pair. The time taken from $t_1$ to $t_3$ is known as the transit time. Individual particle signals are retrieved by signal processing and, subsequently, are used to plot population distribution and perform data analysis.

Data Processing Discussion

The individual data of each impedance signal is stored for post-processing in the forms of its real and imaginary parts. The analysis of experimental data can be performed by plotting the real versus the imaginary parts of each individual signal in a scatter plot. The plots may be used for comparison between experiments and cell line populations. Polystyrene beads may be added to samples as a reference, since they have a narrow size distribution and known dielectric properties. They can be used for the normalization of magnitude and phase of the impedance signal, allowing direct comparison between different particle populations and/or experiments.

Quantification of the DEP Force Discussion

To quantify the DEP force enacting on PDAC cells, the velocity of cells within the DEP system may be tracked and analyzed. Sec, e.g., Rohani A, et al. (2017), "Label-free quantification of intracellular mitochondrial dynamics using dielectrophoresis," Analytical chemistry 89(11):5757-5764; Su Y-H, et al. (2014), "Quantitative dielectrophoretic tracking for characterization and separation of persistent subpopulations of Cryptosporidium parvum," Analyst 139(1): 66-73. DEP spectral measurements may be conducted on a 3DEP dielectrophoretic analyzer (DepTech, UK). The non-uniform electric field is applied to gold-plated electrode stripes inside the wall of individual chambers. The relative DEP force at each frequency may be obtained by analyzing spatio-temporal variations in light intensity from particle scattering after normalizing against the background at zero field ($\nabla |E|^2 = 0$), after accounting for the field profile per Equations 6 and 7. The trajectory of cells within the chamber may be recorded at high frame rate. Using Newton's second law, for a particle of mass m, the net dielectrophoeretic force $F_{DEP}$ on the accelerated particle of radius r, within a medium of viscosity $\eta$, can be determined by tracking its displacement x as a function of time t to obtain (dx/dt) and ($d^2x/dt^2$) for each population analyzed. Thus, the relative DEP force can be approximated using Equation 10.

$$F_{DEP} - 6\pi\eta r \frac{dx}{dt} = m \frac{d^2x}{dt^2} \quad \text{(Equation 10)}$$

The DEP response may be measured at 20 different frequencies (from 10 kHz to 30 MHz) applied individually within 20 individual wells. In this manner, the relative DEP force for each cell line tested can be estimated along the frequency spectrum tested.

For single-shell modelling of PDAC tumor cells, where a particle is suspended in a dielectric medium, dielectric spectroscopy can be used to measure the dielectric properties of the suspension. See, e.g., Pethig R (1985), "Dielectric and electrical properties of biological materials," Journal of Bioelectricity 4(2):vii-ix. This mixture of particle and medium can be approximated to that of a single dispersion using Maxwell's mixture theory (MMT). MMT can be used to combine the dielectric properties of all parts into an overall complex permittivity of the mixture ($\tilde{\varepsilon}_{mix}$) per Equation 11.

$$\tilde{\varepsilon}_{mix} = \tilde{\varepsilon}_{medium}\left(1 + 3\varphi \tilde{f}_{CM,mix}\right) \quad \text{(Equation 11)}$$

In Equation 11, $\varphi$ the volume fraction of the particle in the medium. In practical terms, $\tilde{\varepsilon}_{mix}$ describes the change in the medium permittivity, due to the presence of a particle of a given volume and can only be used if the volume fraction is small, i.e., o $\varphi \ll 1$.

For the case of a single shelled particle, e.g. cell, in suspending medium, MMT can be used to define the dielectric properties of the cell, the volume fraction and the complex impedance of the suspension. Sec, e.g., Green N & Morgan H (2002) AC Electrokinetics: colloids and nanoparticles (Research Studies Press Ltd., USA) and Maxwell J C (1881) A treatise on electricity and magnetism (Clarendon press). Specifically, MMT-based, multi-shell models can be used to retrieve the dielectric properties of the cell. See, e.g., Hanai T, Koizumi N, & Irimajiri A (1975), "A method for determining the dielectric constant and the conductivity of membrane-bounded particles of biological relevance," Biophysics of structure and mechanism 1(4):285-294; Huang Y, Holzel R, Pethig R, & Wang X-B (1992), "Differences in the AC electrodynamics of viable and non-viable yeast cells determined through combined dielectrophoresis and electro-rotation studies," Physics in Medicine & Biology 37(7): 1499; Irimajiri A, Hanai T, & Inouye A (1979), "A dielectric theory of "multi-stratified shell" model with its application to a lymphoma cell," Journal of theoretical biology 78(2): 251-269 and Wang X-B, et al. (1994), "Changes in Friend murine erythroleukaemia cell membranes during induced differentiation determined by electrorotation," Biochimica et Biophysica Acta (BBA)-Biomembranes 1193(2):330-344.

While cells have an intricate internal structure, surrounded by a membrane, a simpler approximation can be used where a single-shell model is applicable. In this model, there are two dispersions, corresponding to each of the existing interfaces (medium-membrane and membrane-interior). For a single-shell model, the Clausius-Mossotti factor of the cell in the mixture is given by Equation 12.

$$\tilde{f}_{CM,mix} = \frac{\tilde{\varepsilon}_{cell} - \tilde{\varepsilon}_{medium}}{\tilde{\varepsilon}_{cell} = 2\tilde{\varepsilon}_{medium}} \quad \text{(Equation 12)}$$

The complex permittivity of the cell, $\tilde{\varepsilon}_{cell}$, in a single shell model can be calculated per Equations 13-15.

$$\tilde{\varepsilon}_{cell} = \tilde{\varepsilon}_{membrane} \frac{\gamma^3 + 2\tilde{f}_{CM,cell}}{\gamma^3 - \tilde{f}_{CM,cell}} \quad \text{(Equation 13)}$$

$$\tilde{f}_{CM,cell} = \frac{\tilde{\varepsilon}_{interior} - \tilde{\varepsilon}_{membrane}}{\tilde{\varepsilon}_{interior} + 2\tilde{\varepsilon}_{membrane}} \quad \text{(Equation 14)}$$

$$\gamma = \frac{r_{interior} + d_{membrane}}{r_{interior}} = \frac{r_{cell}}{r_{interior}} \quad \text{(Equation 15)}$$

In Equation 13, $\tilde{\varepsilon}_{interior}$ and $\tilde{\varepsilon}_{membrane}$ are the complex permittivity of interior and membrane, $r_{interior}$ the inner radius of the cell and $d_{membrane}$ the thickness of the cell membrane ($d_{membrane} \ll r_{interior}$).

From the single shell model, these estimated properties are used to calculate cell interior conductivity ($\sigma_{interior}$) and membrane capacitance ($C_{membrane}$) using Equations 16 and 17.

$$\tilde{\varepsilon}_{interior} = \varepsilon_o \varepsilon_{interior} - i \frac{\sigma_{interior}}{\omega} \quad \text{(Equation 16)}$$

$$C_{membrane} = \frac{\tilde{\varepsilon}_{membrane}}{d_{membrane}} \quad \text{(Equation 17)}$$

For the specific case of cancer calls, previous dielectric studies have shown that $C_{membrane}$ varies greatly between cell lines and cancer origin. See, e.g., Gascoyne, P. R., S. Shim, J. Noshari, F. F. Becker, and K. Stemke-Hale (2013), Correlations between the dielectric properties and exterior morphology of cells revealed by dielectrophoretic field-flow fractionation. Electrophoresis. 34(7): p. 1042-1050. It can be shown that the presence of membrane features such as ruffles, folds or microvilli, and differences in membrane area associated with changes in cell size that affected $C_{membrane}$ estimation. The single shell model assumes a "smooth" cell membrane, and usually estimates $C_{membrane}$~9 mF m$^{-2}$ for smooth, spherical cells. Thus, the model struggles to correctly approximate the $C_{membrane}$ for cancer cells, where the aforementioned membrane alterations occur. However, these known alterations to cancer cell membranes cause an effective increase in $C_{membrane}$ by a folding factor $\phi \geq 1$, obtained by taking in consideration the changes to surface area and cell size. Using the comprehensive list of dielectric and modelling properties presented by Gascoyne et al. (referenced above), and using cell size as reference, folding factors for each cell line can then be estimated. Thus, the corrected $C_{membrane}$ for each cancer line modelled can be obtained by applying an appropriate folding factor $\phi$ to the single shell model fit derived membrane capacitance.

Assessment of Patient-Derived Tumors for Drug Sensitivity

The exemplary method and system may be used to assess patient-derived tumors for drug sensitivity. With the emergence of precision medicine in cancer, there is an ever-greater usefulness for tools capable of screening patients for particular therapies by assessing patient-derived tumors for drug sensitivity. However, these tools should to be able to provide actionable information using the limited number of cells available through less invasive fine needle biopsies, while being capable of repeated real-time analysis to monitor the stochastic nature of drug-induced tumor cell death, since prior knowledge on the cell death mechanism is unavailable for targeting with particular stains and the sample handling steps of the fragile apoptotic cells need to be minimized; all of which are not possible with conventional flow cytometry.

In this context, since alterations in subcellular electrophysiology in response to drug-induced apoptosis or autophagy occur earlier in the cell cycle than apparent with staining-based or imaging approaches, the exemplary method and system in using electrophysiology for kinetic monitoring may be used to track differences in stochastic cell sensitivity to various drugs. Additionally, the exemplary electrophysiology method and system require no sample preparation steps for staining or image contrast enhancement, thereby preserving the state of fragile apoptotic cells. Hence, such a label-free method would facilitate study of drug assessment with a wider set of patient-derived tumor cells, with no need for prior knowledge on the cell death mechanism. As a non-limiting example, sensitivity of the electrophysiology of patient-derived pancreatic tumor xenografts (PDXs) to the chemotherapy drug gemcitabine may be used to illustrate the assay. Currently, treatment with folfirinox drug combination is the preferred first-line therapy for pancreatic cancer, but a significant fraction of patients cannot tolerate the overall drug cytotoxicity. Hence, it is of interest to develop a rapid assay to identify gemcitabine sensitivity that has lower cytotoxicity but is effective in particular patient sets. Hence, using two PDXs: 608 that is known to be sensitive to gemcitabine and mPanc that is known to be relatively more resistant to gemcitabine, the exemplary method and system may be used to follow the kinetics of alterations in key electrophysiology parameters.

Figure 15B:
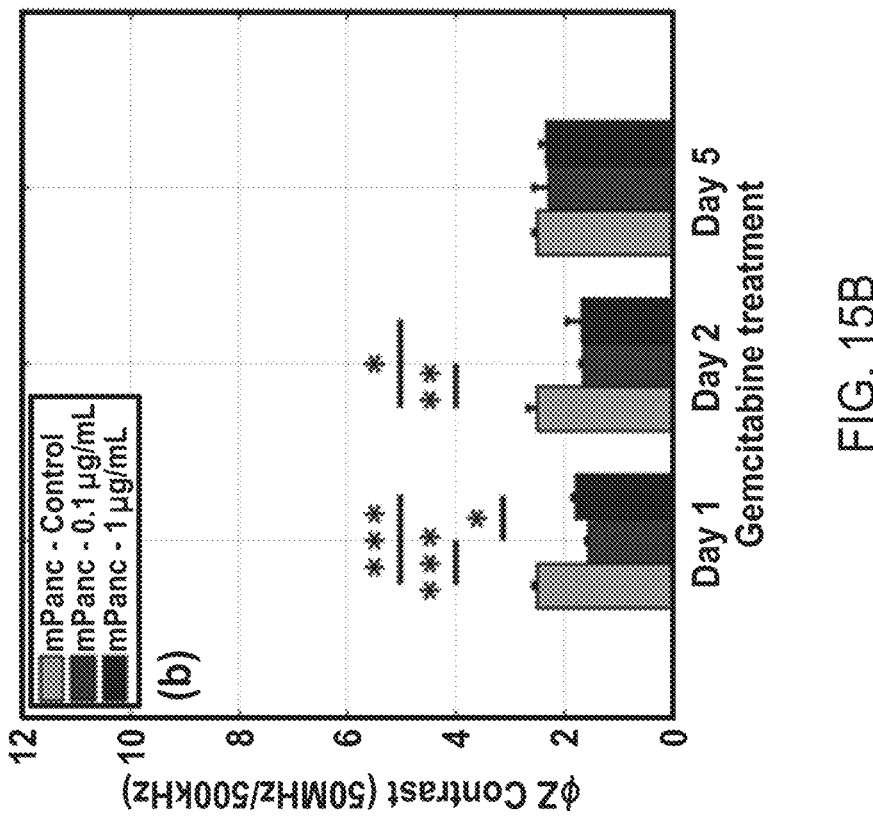
FIGS. 15A and 15B show experimental data in using the exemplary method and system to assess patient-derived tumors for drug sensitivity in accordance with an illustrative embodiment.
Figure 15A:
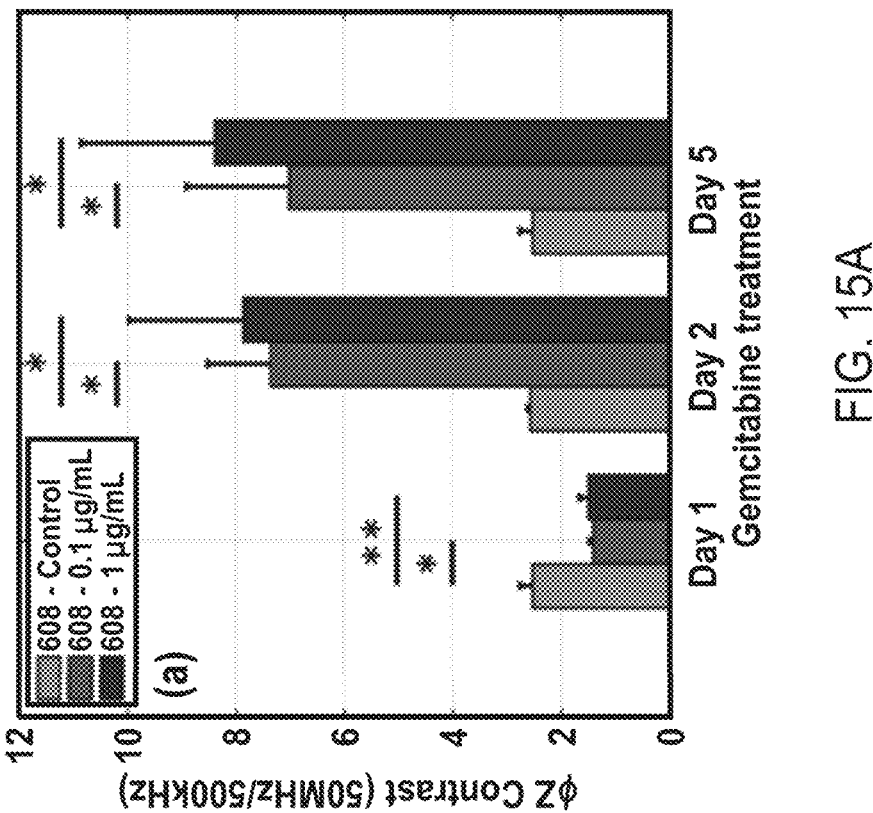
Figures 16A, 16B, 16C, 16D, 16E, 16F:
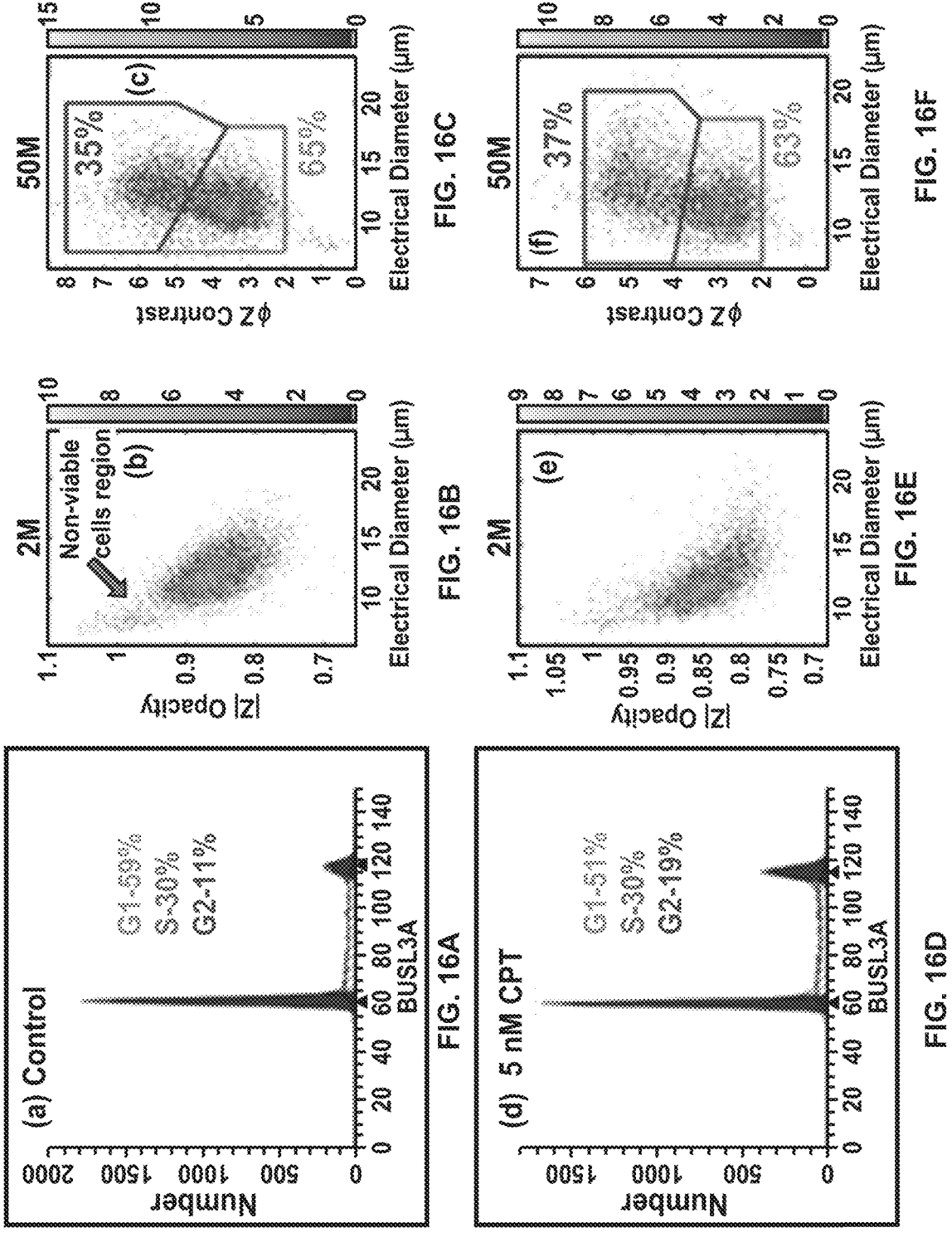
FIG. 16, comprising sub-panes (a)-(i), hereinafter referred to as FIGS. 16A, 16B, 16C, 16D, 16E, 16F, 16G, 16H, 16I, 16J, 16K, and 16L, illustrates that the exemplary impedance contrast method and system can be used to detect differences of phases of cell cycle in accordance with an illustrative embodiment.

FIGS. 15A and 15B show experimental data in using the exemplary method and system to assess patient-derived tumors for drug sensitivity in accordance with an illustrative embodiment.

Using the exemplary impedance phase contrast as the metric for gauging the effect of Gemcitabine treatment using a standard 2D cell culture plate, FIG. 15A shows that statistically significant differences were observed between the Control (untreated) versus Gemcitabine-treated PDXs of 608 right from Day 1, but more clearly Day 2-5. On the other hand, for Control (untreated) versus Gemcitabine-treated PDXs of mPanc (FIG. 15B), the alterations are only modest over all five days. Indeed, the drug sensitivity determination based on tumor size takes 5 days.

Assessment of Cell Cycle Phase

The exemplary method and system may be used to assess phases of cell cycle, e.g., for stem cells.

Quantifying the proportion of cells in each phase of a cell cycle, including mitotic phases is widely carried out by flow cytometry using a stoichiometric fluorescent stain for DNA that reports the cells' position within the G1, S and G2 phases of the cell cycle. However, these stains are not compatible with live cell analysis. Hence, the exemplary method and system has utility in providing label-free means for cell cycle analysis while also doing so without need for high computational power.

FIG. 16 illustrates that the exemplary impedance contrast method and system can be used to detect lineage of cells based on differences of phases of cell cycle in accordance with an illustrative embodiment. That is, differences in electrophysiology between cells in G1 phase versus those with S and G2 phase can be detected using the phase contrast metric that is sensitive to interior conductivity, which can be an indicator of nucleus size (i.e., cell cycle phase/stage).

In FIG. 16, it can be observed that increasing the proportion of cells in the G2 phase increases the proportion of cells in the high impedance phase contrast ($\phi Z$ contrast) region between 5 nM and 10 nM CPT treatment, whereas lowering the proportion of cells in G2 phase by 100 nm CPT treatment lowers the proportion of cells in the high impedance phase contrast ($\phi Z$ contrast) region.

FIGS. 16A, 16D, 16G, and 16J, corresponding to sub-panel (a), (d), (g), and (j) are from flow cytometry, while the analogous impedance cytometry plots are in FIGS. 16B, 16C, 16E, 16F, 16H, 16I, 16K, and 16L (corresponding to subpanel (b) and (c), (e) and (f), (h) and (i), and (k) and (l)), respectively.

As per FIG. 16, indeed, CPT treatment at 5 nM and 10 nM levels increases the proportion of the sum of S and G2 phase cells, which can be detected based on the proportion of cells in the high impedance phase contrast ($\phi Z$ contrast) region. On the other hand, CPT treatment at 100 nM levels lowers the proportion of cells in the G2 phase while increasing the proportion of cells in S phase, which causes a substantive decrease of proportion of cells in the high impedance phase contrast ($\phi Z$ contrast) region.

The specific configurations, choice of materials and the size and shape of various elements can be varied according to particular design specifications or constraints requiring a system or method constructed according to the principles of the disclosed technology. Such changes are intended to be embraced within the scope of the disclosed technology. The presently disclosed embodiments, therefore, are considered in all respects to be illustrative and not restrictive. The patentable scope of certain embodiments of the disclosed technology is indicated by the appended claims, rather than the foregoing description.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the disclosure (and claims), including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive.

For example, the exemplary method and system using impedance phase and/or amplitude contrast may be used in conjunction with other contrast quantification available in the art, including image analysis-based quantification. Similarly, the exemplary method and system may be used with label-free as well as labeled samples in labeled separation and cytometry (e.g., verification, etc.). Similarly, the exemplary method and system may be used with low-throughput systems.

Indeed, the exemplary method and system may be used in combination with, and not limited to, system and method described in International Patent Application Serial No. PCT/US2017/5 028607, entitled "SYSTEMS FOR ISOLATING AND TRANSPLANTING PANCREATIC ISLETS", filed Apr. 20, 2017; Publication No. WO 2017/184854, Oct. 26, 2017; U.S. Utility patent application Ser. No. 15/515, 528, entitled "IDENTIFICATION AND MONITORING OF CELLS BY DIELECTROPHORETIC TRACKING OF ELECTROPHYSIOLOGY AND PHENOTYPE", filed Mar. 29, 2017; Publication No. US-2017-0218424-A1, Aug. 3, 2017; International Patent Application Serial No. PCT/US2015/055021, entitled "IDENTIFICATION AND MONITORING OF CELLS BY DIELECTROPHORETIC TRACKING OF ELECTROPHYSIOLOGY AND PHENO-TYPE", filed Oct. 9, 15 2015; Publication No. WO2016057974, Apr. 14, 2016; J. A. Kashatus, et al., Erk2 Phosphorylation of Drp1 Promotes Mitochondrial Fission and MAPK-Driven Tumor Growth", Molecular Cell 2015, 57 (3), 537-551; A. Rohani, et al., "Label-free quantification of alterations in intracellular mitochondrial dynamics using dielectrophoresis", Analytical Chemistry 2017, 89 (11), 5757-5764; U.S. Patent Application Publication No. US 2012/0142032 A1, Morgan, et al., "Multi-frequency impedance method and apparatus for discriminating and counting particles expressing a specific marker", Jun. 7, 2012; Tao Sun, et al., "Single-cell microfluidic impedance cytometry: a review", 25 Microfluidics and Nanofluidics, April 2010, Vol. 8, Issue 4, pp 423-443; European Patent Application Publication No. EP 2259044 A1, Koninklijke Phillips, NV, "Multi-frequency impedance method and apparatus for discriminating and counting particles expressing a specific marker", Dec. 8, 2010; U.S. Pat. No. 10,024,780 B2, Shah, et al., "Methods for Detecting Events in a Flow Cytometer", Jul. 17, 2018; and U.S. Pat. No. 5,631,165, Chupp, et al., "Method for Performing Automated Hematology and Cytometry Analysis", May 20, 1997, each of which is incorporated by reference herein in its entirety.

Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

LIST OF REFERENCES

[1] Rahib, L., B. D. Smith, R. Aizenberg, A. B. Rosenzweig, J. M. Fleshman, and L. M. Matrisian, Projecting cancer incidence and deaths to 2030: the unexpected burden of thyroid, liver, and pancreas cancers in the United States. Cancer Research, 2014. 74(11): p. 2913-2921.

[2] Neoptolemos, J. P., D. D. Stocken, H. Friess, C. Bassi, J. A. Dunn, H. Hickey, H. Beger, L. Fernandez-Cruz, C. Dervenis, and F. Lacaine, A randomized trial of chemo-radiotherapy and chemotherapy after resection of pancreatic cancer. New England Journal of Medicine, 2004. 350 (12): p. 1200-1210.

[3] Siegel, R. L., K. D. Miller, and A. Jemal, Cancer statistics, 2017. CA: A Cancer Journal for Clinicians, 2017. 67 (1): p. 7-30.

[4] Smith, B. D., G. L. Smith, A. Hurria, G. N. Hortobagyi, and T. A. Buchholz, Future of cancer incidence in the United States: burdens upon an aging, changing nation. Journal of Clinical Oncology, 2009. 27 (17): p. 2758-2765.

[5] Swords, D. S., M. A. Firpo, C. L. Scaife, and S. J. Mulvihill, Biomarkers in pancreatic adenocarcinoma: current perspectives. OncoTargets and therapy, 2016. 9: p. 7459.

[6] Bryant, K. L., J. D. Mancias, A. C. Kimmelman, and C. J. Der, KRAS: feeding pancreatic cancer proliferation. Trends in Biochemical Sciences, 2014. 39(2): p. 91-100.

[7] Lu, S., H. Jang, R. Nussinov, and J. Zhang, The structural basis of oncogenic mutations G12, G13 and Q61 in small GTPase K-Ras4B. Scientific reports, 2016. 6: p. 21949.

[8] Guck, J., S. Schinkinger, B. Lincoln, F. Wottawah, S. Ebert, M. Romeyke, D. Lenz, H. M. Erickson, R. Ananthakrishnan, and D. Mitchell, Optical deformability as an inherent cell marker for testing malignant transformation and metastatic competence. Biophysical journal, 2005. 88(5): p. 3689-3698.

[9] Kraning-Rush, C. M., J. P. Califano, and C. A. Reinhart-King, Cellular traction stresses increase with increasing metastatic potential. PloS one, 2012. 7(2): p. e32572.

[10] Spencer, D., F. Caselli, P. Bisegna, and H. Morgan, High accuracy particle analysis using sheathless microfluidic impedance cytometry. Lab on a Chip, 2016. 16(13): p. 2467-2473.

[11] Song, H., Y. Wang, J. M. Rosano, B. Prabhakarpandian, C. Garson, K. Pant, and E. Lai, A microfluidic impedance flow cytometer for identification of differentiation state of stem cells. Lab on a Chip, 2013. 13(12): p. 2300-2310.

[12] McGrath, J., C. Honrado, D. Spencer, B. Horton, H. Bridle, and H. Morgan, Analysis of parasitic Protozoa at the single-cell level using microfluidic impedance cytometry. Scientific reports, 2017. 7(1): p. 2601.

[13] Honrado, C., L. Ciuffreda, D. Spencer, L. Ranford-Cartwright, and H. Morgan, Dielectric characterization of Plasmodium falciparum-infected red blood cells using microfluidic impedance cytometry. Journal of The Royal Society Interface, 2018. 15(147): p. 20180416.

[14] Kamande, J., M. Hupert, M. Witek, H. Wang, R. Torphy, U. Dharmasiri, S. Njoroge, J. Jackson, R. Aufforth, and A. Snavely, Modular microsystem for the isolation, enumeration, and phenotyping of circulating tumor cells in patients with pancreatic cancer. Analytical chemistry, 2013. 85(19): p. 9092-9100.

[15] Torphy, R. J., C. J. Tignanelli, J. W. Kamande, R. A. Moffitt, S. G. H. Loeza, S. A. Soper, and J. J. Yeh, Circulating tumor cells as a biomarker of response to treatment in patient-derived xenograft mouse models of pancreatic adenocarcinoma. PloS one, 2014. 9(2): p. e89474.

[16] Gupta, D., C. G. Lis, S. L. Dahlk, P. G. Vashi, J. F. Grutsch, and C. A. Lammersfeld, Bioelectrical impedance phase angle as a prognostic indicator in advanced pancreatic cancer. British Journal of Nutrition, 2004. 92(6): p. 957-962.

[17] Stokes, J. B., S. J. Adair, J. Slack-Davis, D. M. Walters, R. W. Tilghman, E. D. Hershey, B. Lowrey, K. S. Thomas, A. H. Bouton, and R. F. Hwang, Inhibition of focal adhesion kinase by PF-562,271 inhibits the growth and metastasis of pancreatic cancer concomitant with altering the tumor microenvironment. Molecular cancer therapeutics, 2011: p. MCT.0261.2011.

[18] Walters, D. M., J. M. Lindberg, S. J. Adair, T. E. Newhook, C. R. Cowan, J. B. Stokes, C. A. Borgman, E. B. Stelow, B. T. Lowrey, and M. E. Chopivsky, Inhibition of the growth of patient-derived pancreatic cancer xenografts with the MEK inhibitor trametinib is augmented by combined treatment with the epidermal growth factor receptor/HER2 inhibitor lapatinib. Neoplasia, 2013. 15(2): p. IN8-IN10.

[19] Rohani, A., J. H. Moore, J. A. Kashatus, H. Sesaki, D. F. Kashatus, and N. S. Swami, Label-free quantification of intracellular mitochondrial dynamics using dielectrophoresis. Analytical chemistry, 2017. 89(11): p. 5757-5764.

[20] Su, Y.-H., A. Rohani, C. A. Warren, and N. S. Swami, Tracking Inhibitory alterations during interstrain Clostridium difficile interactions by monitoring cell envelope capacitance. ACS infectious diseases, 2016. 2(8): p. 544-551.

[21] Newhook, T. E., J. M. Lindberg, S. J. Adair, A. J. Kim, E. B. Stelow, O. E. Rahma, J. T. Parsons, and T. W. Bauer, Adjuvant trametinib delays the outgrowth of occult pancreatic cancer in a mouse model of patient-derived liver metastasis. Annals of surgical oncology, 2016. 23(6): p. 1993-2000.

[22] Spencer, D., V. Hollis, and H. Morgan, Microfluidic impedance cytometry of tumour cells in blood. Biomicrofluidics, 2014. 8(6): p. 064124.

[23] Gawad, S., L. Schild, and P. Renaud, Micromachined impedance spectroscopy flow cytometer for cell analysis and particle sizing. Lab on a Chip, 2001. 1(1): p. 76-82.

[24] Küttel, C., E. Nascimento, N. Demierre, T. Silva, T. Braschler, P. Renaud, and A. G. Oliva, Label-free detection of Babesia bovis infected red blood cells using impedance spectroscopy on a microfabricated flow cytometer. Acta tropica, 2007. 102(1): p. 63-68.

[25] C. Honrado, L. C., D. Spencer, L. Ranford-Cartwright, H. Morgan, Dielectric characterization of Plasmodium falciparum-infected red blood cells using microfluidic impedance cytometry. J. R. Soc. Interface 2018. 15: p. 20180416.

[26] Campbell, P. J., S. Yachida, L. J. Mudie, P. J. Stephens, E. D. Pleasance, L. A. Stebbings, L. A. Morsberger, C. Latimer, S. McLaren, and M.-L. Lin, The patterns and dynamics of genomic instability in metastatic pancreatic cancer. Nature, 2010. 467(7319): p. 1109.

[27] Collisson, E. A., A. Sadanandam, P. Olson, W. J. Gibb, M. Truitt, S. Gu, J. Cooc, J. Weinkle, G. E. Kim, and L. Jakkula, Subtypes of pancreatic ductal adenocarcinoma and their differing responses to therapy. Nature medicine, 2011. 17(4): p. 500.

[28] Le Large, T., M. Bijlsma, G. Kazemier, H. van Laarhoven, E. Giovannetti, and C. Jimenez, Key biological processes driving metastatic spread of pancreatic cancer as identified by multi-omics studies. Seminars in cancer biology, 2017. 44: p. 153-169.

[29] Herman, J. M., M. J. Swartz, C. C. Hsu, J. Winter, T. M. Pawlik, E. Sugar, R. Robinson, D. A. Laheru, E. Jaffee, and R. H. Hruban, Analysis of fluorouracil-based adjuvant chemotherapy and radiation after pancreaticoduodenectomy for ductal adenocarcinoma of the pancreas: results of a large, prospectively collected database at the Johns Hopkins Hospital. Journal of Clinical Oncology, 2008. 26(21): p. 3503.

[30] Pohl, H. A., The motion and precipitation of suspensoids in divergent electric fields. Journal of Applied Physics, 1951. 22(7): p. 869-871.

[31] Pethig, R., Dielectrophoresis: Status of the theory, technology, and applications. Biomicrofluidics, 2010. 4(2): p. 022811.

[32] Morgan, H., T. Sun, D. Holmes, S. Gawad, and N. G. Green, Single cell dielectric spectroscopy. Journal of Physics D: Applied Physics, 2006. 40(1): p. 61.

[33] Gascoyne, P. R., S. Shim, J. Noshari, F. F. Becker, and K. Stemke-Hale, Correlations between the dielectric properties and exterior morphology of cells revealed by dielectrophoretic field-flow fractionation. Electrophoresis, 2013. 34(7): p. 1042-1050.

[34] Li, M. and R. K. Anand, Integration of marker-free selection of single cells at a wireless electrode array with parallel fluidic isolation and electrical lysis. Chemical science, 2019. 10(5): p. 1506-1513.

[35] Su, Y.-H., C. A. Warren, R. L. Guerrant, and N. S. Swami, Dielectrophoretic monitoring and interstrain separation of intact *Clostridium difficile* based on their S (Surface)-layers. Analytical chemistry, 2014. 86(21): p. 10855-10863.

[36] Rohani, A., J. H. Moore, Y.-H. Su, V. Stagnaro, C. Warren, and N. S. Swami, Single-cell electro-phenotyping for rapid assessment of *Clostridium difficile* heterogeneity under vancomycin treatment at sub-MIC (minimum inhibitory concentration) levels. Sensors and Actuators B: Chemical, 2018. 276: p. 472-480.

[37] Crowther, C. V., S. H. Hilton, L. Kemp, and M. A. Hayes, Isolation and identification of *Listeria monocytogenes* utilizing DC insulator-based dielectrophoresis. Analytica chimica acta, 2019. 1068: p. 41-51.

[38] Brar, G., E. M. Blais, R. J. Bender, J. R. Brody, D. Sohal, S. Madhavan, V. J. Picozzi, A. E. Hendifar, V. M. Chung, and D. Halverson, Multi-omic molecular comparison of primary versus metastatic pancreatic tumours. British journal of cancer, 2019: p. 1.

[39] Hänzelmann, S., R. Castelo, and J. Guinney, GSVA: gene set variation analysis for microarray and RNA-seq data. BMC bioinformatics, 2013. 14(1): p. 7.

[40] Ashburner, M., C. A. Ball, J. A. Blake, D. Botstein, H. Butler, J. M. Cherry, A. P. Davis, K. Dolinski, S. S. Dwight, and J. T. Eppig, Gene ontology: tool for the unification of biology. Nature genetics, 2000. 25(1): p. 25.

[41] Consortium, G. O., The Gene Ontology (GO) database and informatics resource. Nucleic acids research, 2004. 32(1): p. D258-D261.

[42] Dingledine, R., K. Borges, D. Bowie, and S. F. Traynelis, The glutamate receptor ion channels. Pharmacological reviews, 1999. 51(1): p. 7-62.

[43] Ambrosini, A., L. Bresciani, S. Fracchia, N. Brunello, and G. Racagni, Metabotropic glutamate receptors negatively coupled to adenylate cyclase inhibit N-methyl-D-aspartate receptor activity and prevent neurotoxicity in mesencephalic neurons in vitro. Molecular pharmacology, 1995. 47(5): p. 1057-1064.

[44] Sharon, D., D. Vorobiov, and N. Dascal, Positive and negative coupling of the metabotropic glutamate receptors to a G protein-activated K+ channel, GIRK, in Xenopus oocytes. The Journal of general physiology, 1997. 109(4): p. 477-490.

[45] Yun, J., C. Rago, I. Cheong, R. Pagliarini, P. Angenendt, H. Rajagopalan, K. Schmidt, J. K. Willson, S. Markowitz, and S. Zhou, Glucose deprivation contributes to the development of KRAS pathway mutations in tumor cells. Science, 2009. 325(5947): p. 1555-1559.

[46] Ying, H., A. C. Kimmelman, C. A. Lyssiotis, S. Hua, G. C. Chu, E. Fletcher-Sananikone, J. W. Locasale, J. Son, H. Zhang, and J. L. Coloff, Oncogenic Kras maintains pancreatic tumors through regulation of anabolic glucose metabolism. Cell, 2012. 149(3): p. 656-670.

[47] Pierro, C., S. J. Cook, T. C. Foets, M. D. Bootman, and H. L. Roderick, Oncogenic K-Ras suppresses IP3-dependent Ca2+ release through remodeling of IP3Rs isoform composition and ER luminal Ca2+ levels in colorectal cancer cell lines. Journal of Cell Science, 2014: p. jcs-141408.

[48] Pierro, C., X. Zhang, C. Kankeu, M. Trebak, M. D. Bootman, and H. L. Roderick, Oncogenic KRAS suppresses store-operated Ca2+ entry and ICRAC through ERK pathway-dependent remodelling of STIM expression in colorectal cancer cell lines. Cell calcium, 2018. 72: p. 70-80.

[49] Monteith, G. R., N. Prevarskaya, and S. Roberts-Thomson, The calcium-cancer signalling nexus. Nature Reviews Cancer, 2017. 17(6): p. 367.

[50] Newhook, T. E., J. M. Lindberg, S. J. Adair, E. Blais, J. Papin, L. Gray, J. T. Parsons, and T. W. Bauer. Combination therapy with a MEK inhibitor plus T-type calcium channel inhibitor is highly effective in patient-derived pancreatic ductal adenocarcinomas. in AACR Annual Meeting 2014. 2014. San Diego, CA: AACR.

[51] Korošec, B., D. Glavač, M. Volavšek, and M. Ravnik-Glavač, ATP2A3 gene is involved in cancer susceptibility. Cancer genetics and cytogenetics, 2009. 188(2): p. 88-94.

[52] Foggia, L., I. Aronchik, K. Aberg, B. Brown, A. Hovnanian, and T. M. Mauro, Activity of the hSPCA1 Golgi Ca2+ pump is essential for Ca2+-mediated Ca2+ response and cell viability in Darier disease. Journal of cell science, 2006. 119(4): p. 671-679.

What is claimed is:

1. A method of operating a microfluidic chip, the method comprising:

flowing one or more samples comprising biologic or particle components in a plurality of microfluidic channels of the microfluidic chip, including a first channel and a second channel, wherein each of the first channel and the second channel includes an upstream microfluidic channel and a plurality of downstream microfluidic channels, wherein each upstream microfluidic channel is connected to a respective plurality of downstream microfluidic channels;

applying a first set of electric field across a first set of one or more electrodes located in a first channel containing a first sample of the one or more samples to provide an on-chip measured impedance spectra; and controlling polarization and/or manipulation of the biologic or particle components flowing through the second channel based on the on-chip measured impedance spectra by applying a second set of electric field across a second set of one or more electrodes located in a microfluidic channel containing a second sample of the one or more samples to selectively urge the biologic or particle components of the second sample into one or more lanes of a plurality of lanes in a flow to continuously separate the biologic or particle components to channel inlets of the respective plurality of downstream microfluidic channels.

2. The method of claim 1, further comprising:

applying a third set of electric field across a third set of one or more electrodes located in at least one downstream microfluidic channel of the plurality of downstream microfluidic channels, including in a first downstream microfluidic channel to interrogate, via the third set of one or more electrodes, electrical responses of the separated biologic or particle components in the at least one downstream microfluidic channel, including electrical responses of the separated biologic or particle components in the first downstream microfluidic channel, wherein the electrical responses are analyzed via impedance magnitude-based contrast and/or impedance phase-based contrast for quantification and/or analysis of the separated biologic or particle components in at least the first downstream microfluidic channel, and wherein the applied first set of electric field continuously separates the biologic or particle components into a second downstream microfluidic channel of the plurality of downstream microfluidic channels, wherein the biologic or particle components sorted to the second downstream microfluidic channel has a different permittivity or conductivity characteristics to the biologic or particle components sorted to the first downstream microfluidic channel based on impedance characteristics of the biologic or particle components.

3. The method of claim 2, wherein the second set of the one or more electrodes has a first set of spacings among individual electrodes of the set, and wherein the third set of one or more electrodes has a second set of spacings among individual electrodes of the set, wherein the first set of spacings is different from the second set of spacings, and wherein a single source signal when applied to the different spacings of the first set of spacings and the second set of spacings results in the second set of electrodes generating a field having a different temporal profile of impedance in comparison to that of the third set of electrodes.

4. The method of claim 2, wherein the electrical responses of the separated biologic or particle components in the first and second downstream microfluidic channels are measured simultaneously, and wherein the acquired electrical responses are converted to a digitally encoded signal via a common amplifier circuit.

5. The method of claim 4, wherein signals associated with the interrogated electrical responses of the separated biologic or particle components in the first and second downstream microfluidic channels are frequency-division multiplexed into a common bus, and wherein the common bus is connected to the common amplifier circuit.

6. The method of claim 2, wherein the interrogated electrical responses are measured in the first downstream microfluidic channel while the separated biologic or particle components is continuously flowing in the first downstream microfluidic channel.

7. The method of claim 2, wherein the interrogated electrical responses are measured in the first downstream microfluidic channel while the separated biologic or particle components are at a gated position in the first downstream microfluidic channel.

8. The method of claim 2, further comprising:
continuously directing the biologic or particle components via an inertial focusing structure or a deterministic lateral displacement structure located within, or defining, the first microfluidic channel.

9. The method of claim 2, wherein impedance magnitude contrast characteristics and/or impedance phase contrast characteristics are used to stratify lineage of cells or to stratify cells or biologic components with phenotypic heterogeneity based on disease onset and/or drug resistance.

10. The method of claim 1, wherein the microfluidic chip is operatively coupled to a controller that is configured to adjust the first and second set of electric field in real-time.

11. The method of claim 1, further comprising:
quantifying impedance magnitude and/or impedance phase characteristics of the separated biologic or particle components sorted into the second downstream microfluidic channel using the second set of one or more electrodes located in the first downstream microfluidic channel; and
quantifying impedance and/or phase impedance characteristics of separated biologic or particle components sorted into a second downstream microfluidic channel using a third set of one or more electrodes located in the second downstream microfluidic channel.

12. The method of claim 1, wherein the first and second sets of the one or more electrodes are connected to a respective signal source, where each of the respective signal source has a distinct frequency to that of the other signal sources to facilitate frequency-division multiplexing.

13. The method of claim 1, further comprising:
detecting, via one or more position detection electrodes located in the first downstream microfluidic channel, presence of the separated biologic or particle components in the first microfluid channel, wherein the detected presence of the separated biologic or particle components in the first microfluid channel is used for selective interrogation, selective sampling, and/or selective multiplexing of the separated biologic or particle components in the first microfluid channel.

14. The method of claim 1, wherein the second set of electric field applied across the second set of one or more electrodes is similarly, or same, across multiple measurements of multiple biologic or particle components flowing through the first downstream microfluidic channel.

15. The method of claim 1, wherein a same set of different frequencies are applied, across multiple measurements, to each of a group of multiplexed downstream microfluidic channels.

16. The method of claim 1, wherein the second set of electric field applied across the second set of one or more electrodes is varied across multiple measurements of multiple biologic or particle components flowing through the first downstream microfluidic channel.

17. The method of claim 1, wherein different frequencies are swept, across multiple measurements, across each of a respective group of multiplexed downstream microfluidic channels.

18. The method of claim 1, wherein the first downstream microfluidic channel has at least one region having a cross-sectional area different to the channel, wherein the cross-sectional area is sized to increase or reduce velocity of the flow through the first downstream microfluidic channel to improve sensitivity and/or signal-to-noise performance of measurements.

19. The method of claim 1, wherein the downstream microfluidic channel includes a third microfluidic channel that splits into a plurality of parallel channels, wherein each of the plurality of parallel channels defines a second flow rate different than the flow rate of the channel feeding the plurality of parallel channels.

20. A system comprising:
a microfluidic chip comprising a plurality of microfluidic channels configured to receive one or more flowing samples comprising biologic or particle components, each of the plurality of microfluidic channels including a first channel and a second channel, wherein each of the first channel and the second channel includes an upstream microfluidic channel and a plurality of downstream microfluidic channels, wherein each upstream microfluidic channel is connected to a respective plurality of downstream microfluidic channels; and
at least one circuit operatively coupled to the microfluidic chip configured to:
apply a first set of electric field across a first set of one or more electrodes located in a first channel containing a first sample of the one or more samples to provide an on-chip measured impedance spectra, and control polarization and/or manipulation of the biologic or particle components flowing through the second channel based on the on-chip measured impedance spectra by applying a second set of electric field across a second set of one or more electrodes located in a microfluidic channel containing a second sample of the one or more samples to selectively urge the biologic or particle components of the second sample into one or more lanes of a plurality of lanes in a flow to continuously separate the biologic or particle components to channel inlets of the respective plurality of downstream microfluidic channels.

* * * * *